(12) United States Patent
Zheng et al.

(10) Patent No.: US 12,738,998 B2
(45) Date of Patent: Sep. 15, 2026

(54) METHOD AND APPARATUS FOR DETERMINING RADIO CHANNEL MULTIPATH INFORMATION AND RELATED DEVICE

(71) Applicant: HUAWEI TECHNOLOGIES CO., LTD., Shenzhen (CN)

(72) Inventors: Xi Zheng, Shanghai (CN); Yibin Kang, Dongguan (CN); Qi Yan, Xi'an (CN); Xin Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 18/513,628

(22) Filed: Nov. 19, 2023

(65) Prior Publication Data

US 2024/0088963 A1 Mar. 14, 2024

Related U.S. Application Data

(63) Continuation of application No. PCT/CN2022/091470, filed on May 7, 2022.

(30) Foreign Application Priority Data

May 18, 2021 (CN) ......................... 202110550713.5

(51) Int. Cl.
*H04B 7/06* (2006.01)
*H04B 7/0426* (2017.01)
(Continued)

(52) U.S. Cl.
CPC ......... *H04B 7/0617* (2013.01); *H04B 7/0426* (2013.01); *H04B 17/328* (2023.05); *H04L 5/0051* (2013.01)

(58) Field of Classification Search
CPC .. H04B 7/0617; H04B 7/0426; H04B 17/328; H04B 7/0695; H04B 17/391;
(Continued)

(56) References Cited

U.S. PATENT DOCUMENTS 8,014,981 B2 9/2011 Chan et al.
9,083,454 B2 7/2015 Wicker, Jr. et al.
(Continued)

FOREIGN PATENT DOCUMENTS

CN 101982953 A 3/2011
CN 102801664 A 11/2012
(Continued)

OTHER PUBLICATIONS

Hongxiang Xie, Feifei Gao, Shi Jin, Jun Fang and Ying Chang Liang, "Channel Estimation for TDD/FDD Massive MIMO Systems With Channel Covariance Computing," in IEEE Transactions on Wireless Communications, vol. 17, No. 6, pp. 4206-4218, Jun. 2018, doi: 10.1109/TWC.2018.2821667 (Year: 2018).*
(Continued)

*Primary Examiner* — Charles C Jiang
*Assistant Examiner* — Margaret Marie Anderson

(57) ABSTRACT

Embodiments of this application provide a method and an apparatus for determining radio channel multipath information and a related device. A server obtains reference signal received powers of a plurality of downlink beams, and determines a path angle and path strength of a propagation path from an antenna in a power angular spectrum cell indicated by each power angular spectrum cell identity to a grid indicated by each grid identity, based on an association relationship between the reference signal received powers of the plurality of downlink beams and the following: a grid identity, a serving cell identity, and a power angular spectrum cell. The server can determine the radio channel
(Continued)

multipath information based on the reference signal received powers of the plurality of downlink beams, instead of depending on map and engineering parameter information. This helps improve accuracy of the radio channel multipath information.

14 Claims, 8 Drawing Sheets

(51) Int. Cl.
*H04B 17/318* (2015.01)
*H04L 5/00* (2006.01)

(58) Field of Classification Search
CPC .. H04B 7/0413; H04B 17/309; H04B 17/327; H04B 17/346; H04B 17/347; H04L 5/0051; H04W 16/18
See application file for complete search history.

(56) References Cited

U.S. PATENT DOCUMENTS

2015/0326297 A1* 11/2015 Petersson .............. H04L 5/0023 370/329
2018/0152856 A1* 5/2018 Davydov .............. H04L 5/0048
2019/0200246 A1 6/2019 Kerpez et al.
2021/0083737 A1* 3/2021 Capdevielle .......... H04B 17/382
2024/0040501 A1* 2/2024 Yuan ..................... H04W 16/18

FOREIGN PATENT DOCUMENTS

CN 104753618 A 7/2015
CN 106126807 A 11/2016
CN 108512621 A 9/2018
CN 110113119 A 8/2019
CN 111434049 A 7/2020
KR 101261178 B1 5/2013
WO 2020207096 A1 10/2020

OTHER PUBLICATIONS

3rd Generation Partnership Project; Technical Specification Group Radio Access Network; NR; Physical channels and modulation (Release 16), 3GPP TS 38.211 V16.5.0 (Mar. 2021), Technical Specification, total 134 pages.
3rd Generation Partnership Project; Technical Specification Group Radio Access Network; NR; Physical layer procedures for data (Release 16), 3GPP TS 38.214 V16.5.0 (Mar. 2021), Technical Specification, total 171 pages.
Ansuman Adhikary et al., Joint Spatial Division and Multiplexing for mm-Wave Channels, May 24, 2014, total 16 pages.

* cited by examiner

TO FIG. 5B

Figure 5B:
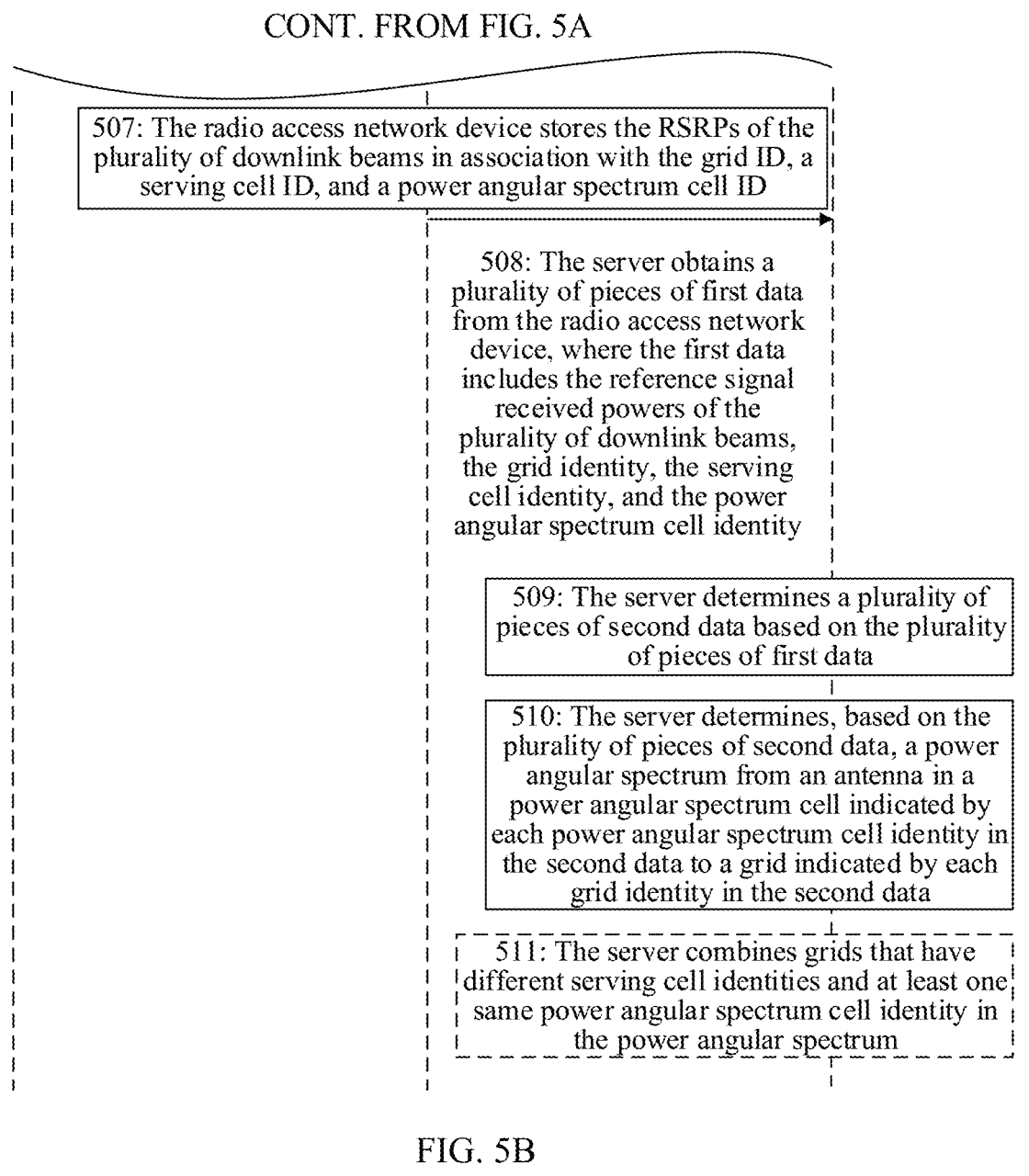

CONT. FROM FIG. 5A

507: The radio access network device stores the RSRPs of the plurality of downlink beams in association with the grid ID, a serving cell ID, and a power angular spectrum cell ID 508: The server obtains a plurality of pieces of first data from the radio access network device, where the first data includes the reference signal received powers of the plurality of downlink beams, the grid identity, the serving cell identity, and the power angular spectrum cell identity 509: The server determines a plurality of pieces of second data based on the plurality of pieces of first data 510: The server determines, based on the plurality of pieces of second data, a power angular spectrum from an antenna in a power angular spectrum cell indicated by each power angular spectrum cell identity in the second data to a grid indicated by each grid identity in the second data 511: The server combines grids that have different serving cell identities and at least one same power angular spectrum cell identity in the power angular spectrum

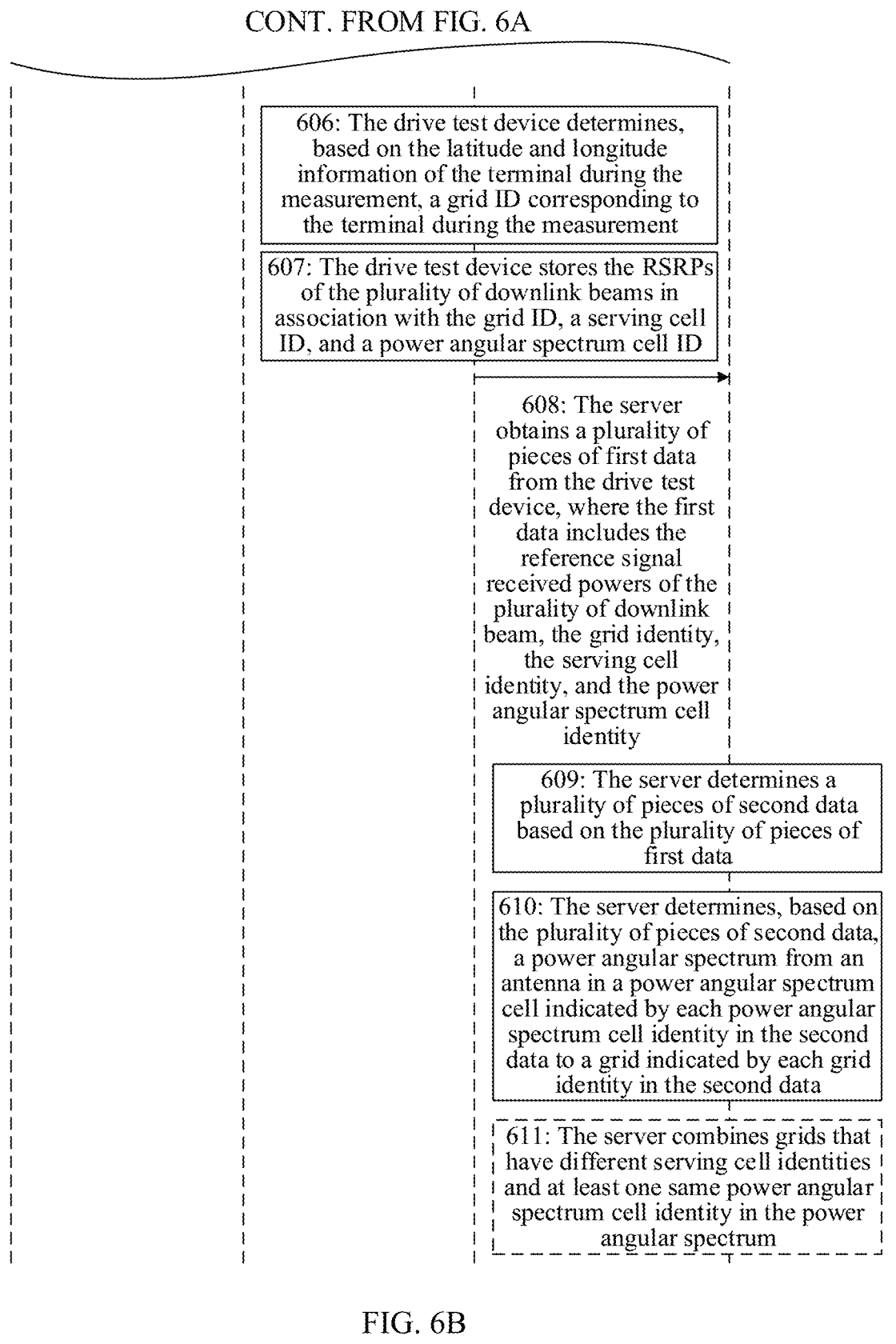

CONT. FROM FIG. 6A

606: The drive test device determines, based on the latitude and longitude information of the terminal during the measurement, a grid ID corresponding to the terminal during the measurement 607: The drive test device stores the RSRPs of the plurality of downlink beams in association with the grid ID, a serving cell ID, and a power angular spectrum cell ID 608: The server obtains a plurality of pieces of first data from the drive test device, where the first data includes the reference signal received powers of the plurality of downlink beam, the grid identity, the serving cell identity, and the power angular spectrum cell identity 609: The server determines a plurality of pieces of second data based on the plurality of pieces of first data 610: The server determines, based on the plurality of pieces of second data, a power angular spectrum from an antenna in a power angular spectrum cell indicated by each power angular spectrum cell identity in the second data to a grid indicated by each grid identity in the second data 611: The server combines grids that have different serving cell identities and at least one same power angular spectrum cell identity in the power angular spectrum

FIG. 6B

METHOD AND APPARATUS FOR DETERMINING RADIO CHANNEL MULTIPATH INFORMATION AND RELATED DEVICE

CROSS-REFERENCE TO RELATED APPLICATIONS

This application is a continuation of International Patent Application No. PCT/CN2022/091470 filed on May 7, 2022, which claims priority to Chinese Patent Application No. 202110550713.5, filed on May 18, 2021. The disclosures of the aforementioned applications are hereby incorporated by reference in their entireties.

TECHNICAL FIELD

This application relates to the field of communication technologies, and in particular, to a method and an apparatus for determining radio channel multipath information and a related device.

BACKGROUND

A new radio communication massive multiple input multiple output (NR Massive MIMO) system can greatly improve a channel capacity through spatial division multiplexing. To further improve network coverage, capacity, and user experience, a server needs to model radio channel multipath conditions at different locations in a network to evaluate impact of network parameters on network performance. A ray tracing technology is mainly used for radio channel multipath modeling. Ray tracing is used to model a radio propagation path from a base station antenna to user equipment based on high-definition map and engineering parameter information and the like through propagation modes such as direct radiation, reflection, projection, and scattering of electromagnetic waves. In this case, accuracy of map and engineering parameter information and the like substantially affects precision of ray tracing in using the ray tracing technology for modeling a radio channel. However, it is difficult to obtain highly accurate map and engineering parameter information in actual scenarios, and consequently this limits precision of the radio channel that is modeled based on the map and engineering parameter information.

SUMMARY

Embodiments of this application provide a method and an apparatus for determining radio channel multipath information and a related device. The method for determining radio channel multipath does not depend on map and engineering parameter information. This helps improve accuracy of the radio channel multipath information.

According to a first aspect, an embodiment of this application provides a method for determining radio channel multipath information. The method for determining radio channel multipath information is performed by a server including a function of determining the radio channel multipath information. The server may obtain reference signal received powers of a plurality of downlink beams and a grid identity, a serving cell identity, and a power angular spectrum cell identity that correspond to the reference signal received powers of the plurality of downlink beams, to determine a plurality of pieces of second data. The second data includes an eigenvalue of reference signal received powers of a plurality of downlink beams with a same grid identity, a same serving cell identity, and a same power angular spectrum cell identity in the plurality of pieces of first data. Then, the server determines, based on the plurality of pieces of second data, a power angular spectrum from an antenna in a power angular spectrum cell indicated by each power angular spectrum cell identity in the second data to a grid indicated by each grid identity in the second data. The power angular spectrum cell is a cell in which a downlink beam received by a terminal device located in the grid is located, and the power angular spectrum includes a path angle and path strength of a propagation path from the antenna in the power angular spectrum cell to the grid. It can be learned that the server does not depend on the information about the map and the engineering parameter, but determines the radio channel multipath information based on the reference signal received powers of the plurality of downlink beams. This helps improve accuracy of the radio channel multipath information.

In an embodiment, the grid identity is a grid identity of a grid included in beam space. The beam space is determined based on reference signal received powers of a plurality of uplink beams. The beam space corresponds to one or more cells. The cell includes a serving cell and a power angular spectrum cell. It can be learned that the grid identity is associated with one or more cells, and is used for replacing the information about the map and the engineering parameter.

In an embodiment, the grid identity is an identity of a grid in geographic space. The geographic space is determined based on latitude and longitude information of the terminal device corresponding to a case that the terminal device measures the reference signal received powers of the plurality of downlink beams in one or more cells. The geographic space corresponds to one or more cells. The cell includes a serving cell and a power angular spectrum cell.

In an embodiment, the server determines the eigenvalue of the reference signal received powers of the plurality of downlink beams with the same grid identity, the same serving cell identity, and the same power angular spectrum cell identity in the plurality of pieces of first data as the second data. The eigenvalue is any one of the following: an average value of the reference signal received powers of the plurality of downlink beams, a median of the reference signal received powers of the plurality of downlink beams, or a mode of the reference signal received powers of the plurality of downlink beams. It can be learned that the server calculates the eigenvalue for the plurality of pieces of first data, which helps eliminate random interference fluctuation, so that accuracy of obtained radio channel multipath information is high.

In an embodiment, the server determines a beam gain of each beam in the power angular spectrum cell based on an antenna gain of the power angular spectrum cell and an antenna port weight of each beam in the power angular spectrum cell. The server determines target path strength based on the beam gain of each beam in the power angular spectrum cell and the second data. The server determines, based on the target path strength, the power angular spectrum from the antenna in the power angular spectrum cell indicated by the power angular spectrum cell identity to the grid indicated by the grid identity. How to determine the target path strength may be modeled as a sparse optimization problem. An input of the sparse optimization problem includes the second data, and an output thereof is the target path strength. The target path strength is a matrix.

In an embodiment, the server combines grids that have different serving cell identities and at least one same power angular spectrum cell identity in the power angular spectrum. It can be learned that the server may alternatively perform grid combination based on similarity of the power angular spectrum, to obtain more concise radio channel multipath information. This helps reduce calculation overheads of the server.

In an embodiment, the server obtains a distance between any two of at least two grids that have different serving cell identities and at least one same power angular spectrum cell identity in the power angular spectrum. The distance is determined based on a quantity of overlapping cells, the power angular spectrum from the antenna in the power angular spectrum cell to the grid, and a distance measurement parameter. The server combines, into one grid, two grids between which a distance is less than a specified threshold in the at least two grids that have the different serving cell identities and the at least one same power angular spectrum cell identity in the power angular spectrum.

According to a second aspect, an embodiment of this application provides another method for determining radio channel multipath information. The method for determining radio channel multipath information is performed by a radio access network device. The radio access network device receives reference signal received powers of a plurality of downlink beams from a terminal device, and determines a plurality of pieces of first data. The first data includes the reference signal received powers of the plurality of downlink beams, a grid identity, a serving cell identity, and a power angular spectrum cell identity. The plurality of pieces of first data are used to determine a plurality of pieces of second data. The second data includes an eigenvalue of reference signal received powers of a plurality of downlink beams with a same grid identity, a same serving cell identity, and a same power angular spectrum cell identity in the plurality of pieces of first data. The plurality of pieces of second data are used to determine a power angular spectrum from an antenna in a power angular spectrum cell indicated by each power angular spectrum cell identity in the second data to a grid indicated by each grid identity in the second data. The power angular spectrum cell is a cell in which a downlink beam received by the terminal device located in the grid is located, and the power angular spectrum includes a path angle and path strength of a propagation path from the antenna in the power angular spectrum cell to the grid. It can be learned that the radio access network device does not need to obtain latitude and longitude information of the terminal device, and is applicable to a scenario in which positioning of the terminal device is difficult. In addition, privacy security of the terminal device is not involved.

In an embodiment, the radio access network device sends the grid identity to the terminal device, where the grid identity indicates the terminal device to measure and report the reference signal received powers of the plurality of downlink beams upon change of the grid identity. It can be learned that the solution helps reduce uplink communication overheads from the terminal device to the radio access network device, and reduce energy consumption of the terminal device.

In an embodiment, the grid identity is a grid identity of a grid included in beam space. The beam space is determined based on reference signal received powers of a plurality of uplink beams. The beam space corresponds to one or more cells. The cell includes a serving cell and a power angular spectrum cell. It can be learned that the grid identity is associated with one or more cells, and is used for replacing the information about the map and the engineering parameter.

In an embodiment, the grid identity is an identity of a grid in geographic space. The geographic space is determined based on latitude and longitude information of the terminal device corresponding to a case that the terminal device measures the reference signal received powers of the plurality of downlink beams. The geographic space corresponds to one or more cells. The cell includes a serving cell and a power angular spectrum cell.

According to a third aspect, an embodiment of this application provides an apparatus for determining radio channel multipath information, where the apparatus includes a transceiver unit and a processing unit. The transceiver unit is configured to obtain a plurality of pieces of first data. The first data includes reference signal received powers of a plurality of downlink beams, a grid identity, a serving cell identity, and a power angular spectrum cell identity. The processing unit is configured to determine a plurality of pieces of second data based on the plurality of pieces of first data. The second data includes an eigenvalue of reference signal received powers of a plurality of downlink beams with a same grid identity, a same serving cell identity, and a same power angular spectrum cell identity in the plurality of pieces of first data. The processing unit is further configured to determine, based on the plurality of pieces of second data, a power angular spectrum from an antenna in a power angular spectrum cell indicated by each power angular spectrum cell identity in the second data to a grid indicated by each grid identity in the second data. The power angular spectrum cell is a cell in which a downlink beam received by a terminal device located in the grid is located, and the power angular spectrum includes a path angle and path strength of a propagation path from the antenna in the power angular spectrum cell to the grid.

In an embodiment, the grid identity is a grid identity of a grid included in beam space. The beam space is determined based on reference signal received powers of a plurality of uplink beams. The beam space corresponds to one or more cells. The cell includes a serving cell and a power angular spectrum cell.

In an embodiment, the grid identity is an identity of a grid in geographic space. The geographic space is determined based on latitude and longitude information of the terminal device corresponding to a case that the terminal device measures the reference signal received powers of the plurality of downlink beams. The geographic space corresponds to one or more cells. The cell includes a serving cell and a power angular spectrum cell.

In an embodiment, that the processing unit is configured to determine a plurality of pieces of second data based on the plurality of pieces of first data includes:

obtaining the reference signal received powers of the plurality of downlink beams with the same grid identity, the same serving cell identity, and the same power angular spectrum cell identity in the plurality of pieces of first data; and determining the eigenvalue of the reference signal received powers of the plurality of downlink beams with the same grid identity, the same serving cell identity, and the same power angular spectrum cell identity in the plurality of pieces of first data, where the eigenvalue is any one of the following: an average value of the reference signal received powers of the plurality of downlink beams, a median of the reference signal received powers of the plurality of downlink beams, or a mode of the reference signal received powers of the plurality of downlink beams.

In an embodiment, that the processing unit is configured to determine, based on the plurality of pieces of second data, a power angular spectrum from an antenna in a power angular spectrum cell indicated by each power angular spectrum cell identity in the second data to a grid indicated by each grid identity in the second data includes:

determining a beam gain of each beam in the power angular spectrum cell based on an antenna gain of the power angular spectrum cell and an antenna port weight of each beam in the power angular spectrum cell;

determining target path strength based on the beam gain of each beam in the power angular spectrum cell and the second data; and determining, based on the target path strength, the power angular spectrum from the antenna in the power angular spectrum cell indicated by the power angular spectrum cell identity to the grid indicated by the grid identity.

In an embodiment, the processing unit is further configured to combine grids that have different serving cell identities and at least one same power angular spectrum cell identity in the power angular spectrum.

In an embodiment, that the processing unit is configured to combine grids that have different serving cell identities and at least one same power angular spectrum cell identity in the power angular spectrum includes:

obtaining a distance between any two of at least two grids that have different serving cell identities and at least one same power angular spectrum cell identity in the power angular spectrum, where the distance is determined based on a quantity of overlapping cells, the power angular spectrum from the antenna in the power angular spectrum cell to the grid, and a distance measurement parameter; and combining, into one grid, two grids between which a distance is less than a specified threshold in the at least two grids that have the different serving cell identities and the at least one same power angular spectrum cell identity in the power angular spectrum.

According to a fourth aspect, an embodiment of this application provides an apparatus for determining radio channel multipath information, where the apparatus includes a transceiver unit and a processing unit. The transceiver unit is configured to receive reference signal received powers of a plurality of downlink beams from a terminal device. The processing unit is configured to determine a plurality of pieces of first data, where the first data includes the reference signal received powers of the plurality of downlink beams, a grid identity, a serving cell identity, and a power angular spectrum cell identity, and the plurality of pieces of first data are used to determine a plurality of pieces of second data. The second data includes an eigenvalue of reference signal received powers of a plurality of downlink beams with a same grid identity, a same serving cell identity, and a same power angular spectrum cell identity in the plurality of pieces of first data. The plurality of pieces of second data are used to determine a power angular spectrum from an antenna in a power angular spectrum cell indicated by each power angular spectrum cell identity in the second data to a grid indicated by each grid identity in the second data. The power angular spectrum cell is a cell in which a downlink beam received by the terminal device located in the grid is located, and the power angular spectrum includes a path angle and path strength of a propagation path from the antenna in the power angular spectrum cell to the grid.

In an embodiment, the transceiver unit is further configured to send the grid identity to the terminal device. The grid identity indicates the terminal device to measure and report the reference signal received powers of the plurality of downlink beams upon change of the grid identity.

In an embodiment, the grid identity is a grid identity of a grid included in beam space. The beam space is determined based on reference signal received powers of a plurality of uplink beams. The beam space corresponds to one or more cells. The cell includes a serving cell and a power angular spectrum cell.

In an embodiment, the grid identity is an identity of a grid in geographic space. The geographic space is determined based on latitude and longitude information of the terminal device corresponding to a case that the terminal device measures the reference signal received powers of the plurality of downlink beams. The geographic space corresponds to one or more cells. The cell includes a serving cell and a power angular spectrum cell.

According to a fifth aspect, an embodiment of this application provides a server. The server may be a device, or a chip or a circuit disposed in the device. The server includes a unit and/or a module configured to perform the method for determining radio channel multipath information provided in any embodiment of the first aspect. Therefore, beneficial effects of the method for determining radio channel multipath information provided in the first aspect can also be achieved.

According to a sixth aspect, an embodiment of this application provides a radio access network device. The radio access network device may be a device, or a chip or a circuit disposed in the device. The radio access network device includes a unit and/or a module configured to perform the method for determining radio channel multipath information provided in any embodiment of the second aspect. Therefore, beneficial effects of the method for determining radio channel multipath information provided in the second aspect can also be achieved.

According to a seventh aspect, this embodiment provides a communication system, where the system includes the apparatus or the server provided in the third aspect or the fifth aspect, and the apparatus or the radio access network device provided in the fourth aspect or the sixth aspect.

According to an eighth aspect, an embodiment of this application provides a computer-readable storage medium, where the readable storage medium includes a program or instructions. When the program or the instructions are run on a computer, the computer is enabled to perform the method according to any one of the implementations of the first aspect or the second aspect.

According to a ninth aspect, an embodiment of this application provides a computer program or a computer program product, including code or instructions. When the code or the instructions are run on a computer, the computer is enabled to perform the method according to any one of the implementations of the first aspect or the second aspect.

According to a tenth aspect, an embodiment of this application provides a chip or a chip system, where the chip or the chip system includes at least one processor and an interface, the interface and the at least one processor are interconnected through a line, and the at least one processor is configured to run a computer program or instructions, to perform the method according to any one of the implementations of the first aspect or the second aspect.

The interface in the chip may be an input/output interface, a pin, a circuit, or the like.

The chip system in the foregoing aspects may be a system on chip (system on chip, SOC), a baseband chip, or the like, where the baseband chip may include a processor, a channel encoder, a digital signal processor, a modem, an interface module, and the like.

In an implementation, the chip or the chip system described above in this application further includes at least one memory, where the at least one memory stores instructions. The memory may be a storage unit, for example, a register or a cache inside the chip, or may be a storage unit (for example, a read-only memory or a random access memory) of the chip.

BRIEF DESCRIPTION OF DRAWINGS

FIG. 5A and FIG. 5B are a flowchart of a method for determining radio channel multipath information in a non-drive test scenario according to an embodiment of this application;

FIG. 6A and FIG. 6B are a flowchart of a method for determining radio channel multipath information in a drive test scenario according to an embodiment of this application;

DESCRIPTION OF EMBODIMENTS

Figure 1:
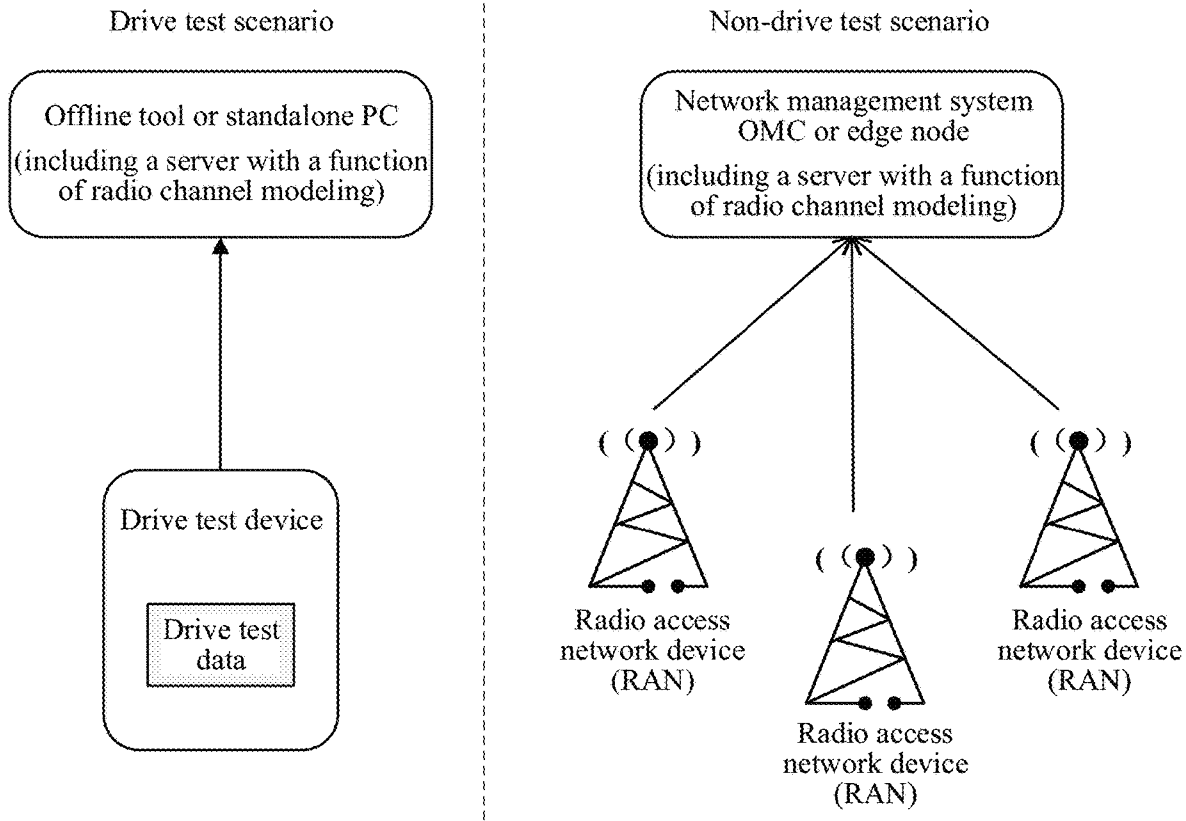
FIG. 1 is a diagram of a system in a drive test scenario and a system in a non-drive test scenario according to an embodiment of this application.

In embodiments of this application, the term such as "example" or "for example" is used for giving an example, an illustration, or a description. Any embodiment or design scheme described as an "example" or "for example" in embodiments of this application should not be explained as being more preferred or having more advantages than another embodiment or design scheme. The use of "example", "for example", or the like is intended to present a related concept.

The terms "second" and "first" in embodiments of this application are merely intended for a purpose of description, and shall not be understood as an indication or implication of relative importance or implicit indication of a quantity of indicated technical features. Therefore, a feature limited by "second" or "first" may explicitly or implicitly include one or more features.

In embodiments of this application, the term "a plurality of" means two or more. For example, a plurality of pieces of first data are two or more pieces of first data.

It should be understood that the terms used in the descriptions of various examples in this specification are merely intended to describe examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be further understood that determining B based on A does not mean that B is determined based only on A. B may alternatively be determined based on A and/or other information.

It should be further understood that, the term "include" (or "includes", "including", "comprises", and/or "comprising"), when being used in this specification, specifies the presence of stated features, integers, steps, operations, elements, and/or components, but does not preclude the presence or addition of one or more other features, integers, steps, operations, elements, components, and/or groups thereof.

The following describes technical solutions in embodiments of this application with reference to the accompanying drawings in embodiments of this application.

A new radio communication massive multiple input multiple output (new radio massive multiple input multiple output, NR Massive MIMO) system can greatly improve channel capacity through spatial division multiplexing. Radio channel multipath information (an angle of departure, an angle of arrival, and path strength of a path in a radio channel and the like) is also an important factor that affects a capacity and a rate of a massive MIMO radio communication system. On this basis, to improve network coverage, capacity, and user experience, a server needs to determine radio channel multipath information at different locations in a network to evaluate impact of network parameters on network performance.

The radio channel multipath information is mainly determined using a ray tracing technology. The ray tracing technology is used to determine a radio propagation path from a base station antenna to user equipment based on high-precision map and engineering parameter information and the like through propagation modes such as direct radiation, reflection, projection, and scattering of electromagnetic waves. In this case, accuracy of map and engineering parameter information and the like substantially affect precision of ray tracing in using the ray tracing technology for modeling a radio channel. However, it is difficult to obtain highly accurate map and engineering parameter information in actual scenarios, and consequently this limits precision of the radio channel that is modeled based on the map and engineering parameter information.

In addition, a method for sensing a radio environment based on channel state information reference signal (CSI-RS) or sounding reference signal (SRS) channel measurement information and further determining a radio channel produces a huge amount of data and has high randomness. Therefore, this method cannot be used for large-scale network-level parameter optimization.

Furthermore, when a radio channel is determined using a propagation model such as SPM and Cost-Hata commonly used in link layer and system layer simulation, only path loss information of the channel can be estimated, and multipath information such as an angle cannot be estimated. A radio channel model constructed using the method is randomly generated based on a propagation scenario, and therefore cannot reflect actual network conditions.

To resolve the foregoing problems, an embodiment of this application provides a method for determining radio channel multipath information. According to the method, a server determines radio channel multipath information based on reference signal received powers of a plurality of downlink beams instead of map and engineering parameter information. This helps improve accuracy of the radio channel multipath information.

The method for determining radio channel multipath information provided in embodiments of this application is applied to a drive test (DT) scenario or a non-drive test scenario shown in FIG. 1. In the drive test scenario, the server that performs the method for determining radio channel multipath information provided in embodiments of this application may be a standalone personal computer (PC) or an offline tool, where DT data is input. In the non-drive test scenario, the server that performs the method for determining radio channel multipath information provided in embodiments of this application may be a network management system, or an edge node that can subscribe to measurement report (MR) data of a radio access network (RAN) device, where MR data is input. It should be noted that the method for determining radio channel multipath information provided in embodiments of this application may be implemented by software, for example, an application program (for example, an application program for determining radio channel multipath information) in a server.

In an implementation, a drive test device in the drive test scenario shown in FIG. 1 may be a terminal device. The terminal device can measure reference signal received powers (RSRPs) of downlink beams in a serving cell and a neighboring cell. In the drive test scenario, while measuring RSRPs of a plurality of downlink beams, the terminal device may also record latitude and longitude information of the terminal device corresponding to a case that the terminal device measures the RSRPs. In another implementation, the non-drive test scenario shown in FIG. 1 further includes a terminal device. The terminal device can measure RSRPs of downlink beams in a serving cell and a neighboring cell, but the terminal device in the non-drive test scenario cannot record latitude and longitude information.

The RAN can provide a network access function for authorized users in a specific area, and can determine transmission tunnels with different quality based on user levels, service requirements, and the like, to transmit user data. An access network forwards control signals and user data between a terminal device and a core network. The access network may include an access network device (or referred to as an access device). The access network device may be, for example, a base station (for example, an eNB) in an LTE system or a base station (for example, an NG-RAN) in a new radio (NR) system, an evolved base station in 3GPP, an access node in a Wi-Fi system, a wireless relay node, or a wireless backhaul node. A base station may be a macro base station, a micro base station, a pico base station, a small cell, a relay station, a balloon station, or the like.

The terminal device is a device having a wireless transceiver function, and may be deployed on the land, including an indoor or outdoor device, a hand-held device, a wearable device, or a vehicle-mounted device, or may be deployed on the water (for example, on a ship), or may be deployed in the air (for example, on a plane, a balloon, or a satellite). The terminal device may be UE, a mobile phone, a tablet computer (Pad), a computer with a wireless transceiver function, a virtual reality (VR) terminal device, or an augmented reality (AR) terminal device, a wireless terminal in an industrial control, a vehicle-mounted terminal device, a wireless terminal in a self driving, a wireless terminal in telemedicine (remote medical), a wireless terminal in a smart grid, a wireless terminal in transportation safety, a wireless terminal in a smart city, a wireless terminal in a smart home, a wearable terminal device, or the like. The terminal device may be fixed or mobile.

There are the following types of RSRPs of a downlink beam: a CSI-RSRP, an SSB-RSRP, and the like. In embodiments of this application, the CSI-RSRP is used as an example for description (where the SSB-RSRP is similar). The radio access network device sends CSI-RS signals of a plurality of beams to the terminal device, to indicate the terminal device to measure CSI-RSRPs. The terminal device measures, based on a CSI-RS signal of each beam, a CSI-RSRP of the corresponding beam. In the non-drive test scenario, the terminal device sends, to the radio access network device, CSI-RSRPs of the plurality of beams obtained through measurement. The radio access network device receives the CSI-RSRPs of the plurality of beams from the terminal device, and stores the CSI-RSRPs of the plurality of beams in the MR data. In the drive test scenario, the terminal device sends, to a drive test data recording device, the CSI-RSRPs of the plurality of beams obtained through measurement.

Figure 2:
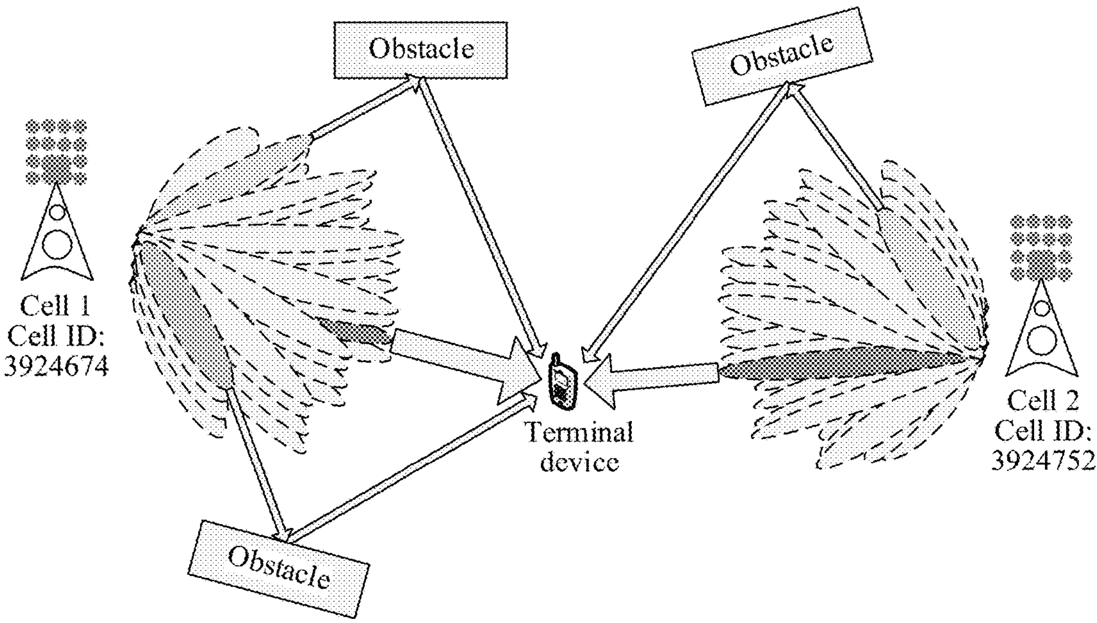
FIG. 2 is a diagram of a massive multiple input multiple output (MIMO) scenario according to an embodiment of this application.

FIG. 2 is a diagram of a massive MIMO scenario according to an embodiment of this application. The massive MIMO scenario includes a cell 1 and a cell 2, and there are 32 beams (4 in a vertical direction*8 in a horizontal direction) in each cell. A darker color of a beam indicates a higher measured value of a CSI-RSRP measured by the terminal device, and a wider ray indicates higher path strength of a path.

For ease of understanding, the following describes related terms in embodiments of this application.

A radio channel is a path between a transmitting end (for example, an antenna, which may be one antenna or may be one or more antenna arrays) and a receiving end (for example, a terminal device) in radio communication, and may include a plurality of channels. The radio channel may also be referred to as a path. The transmitting end may be an antenna (for example, one antenna or one or more antenna arrays), and the receiving end may be a terminal device. The transmitting end may alternatively be a terminal device, and the receiving end may alternatively be an antenna.

Path strength is a path power component of a radio signal with a unit power transmitted to the receiving end. The path strength indicates a ratio of a remaining power of a signal on the path after the signal is propagated in space.

Target path strength is a matrix, where a quantity of dimensions of the matrix is the same as a quantity of horizontal and vertical discretization angles of each beam in a power angular spectrum cell. An element in the matrix represents path strength of a path indicated using an angular discretized horizontal and vertical directions.

A power angular spectrum is a description of a radio channel from an antenna to a grid, and includes a quantity of paths, a path angle, path strength, and other information.

A power angular spectrum cell is a cell in which a downlink beam received by a terminal device located in a grid is located. For example, if the terminal device in FIG. 2 can receive downlink beams separately sent by the cell 1 and the cell 2, both the cell 1 and the cell 2 are power angular spectrum cells.

A serving cell is a cell with a maximum reference signal received power detected by the terminal device.

Massive multiple input multiple output (MIMO) is a multi-antenna form of larger-scale antenna arrays. A massive MIMO antenna implements three-dimensional precise beamforming and multi-stream multi-user multiplexing technologies by integrating more antennas. The massive MIMO technology implements multi-user multiplexing on a same time-frequency resource to achieve better coverage and a larger capacity. In embodiments of this application, the three-dimensional precise beamforming function of the massive MIMO technology is mainly applied.

A beam weight is a quantized expression form obtained by applying a specific excitation signal to ports of an antenna, for the purpose of achieving specific coverage or beamforming. Different antenna weights correspond to a plurality of beam shapes.

A sounding reference signal (SRS) is an uplink pilot signal sent by a terminal device to a radio access network device for obtaining channel quality of each radio channel in each frequency band. A received power of the SRS signal is referred to as an SRS-RSRP.

A channel state information reference signal CSI-RS is a downlink pilot signal sent by the radio access network device to the terminal device. A received power of the CSI-RS signal is referred to as a CSI-RSRP. There are a plurality of types of CSI-RSs in NR, which are used for channel measurement, time-frequency offset tracking, beam management, mobility management, and the like. CSI-RSs in embodiments of this application are all CSI-RSs used for mobility management. The mobility management CSI-RS may be used for measuring a beam-level CSI-RSRP in a serving cell and a neighboring cell of the serving cell.

A measurement report (MR) is a measurement report (not including latitude and longitude information) reported by a terminal device, where the MR may be obtained from a radio access network.

Drive test DT data is a measurement report including latitude and longitude information, where the DT data is reported by a terminal device, and is obtained by connecting a test terminal to dedicated software.

Figure 3:
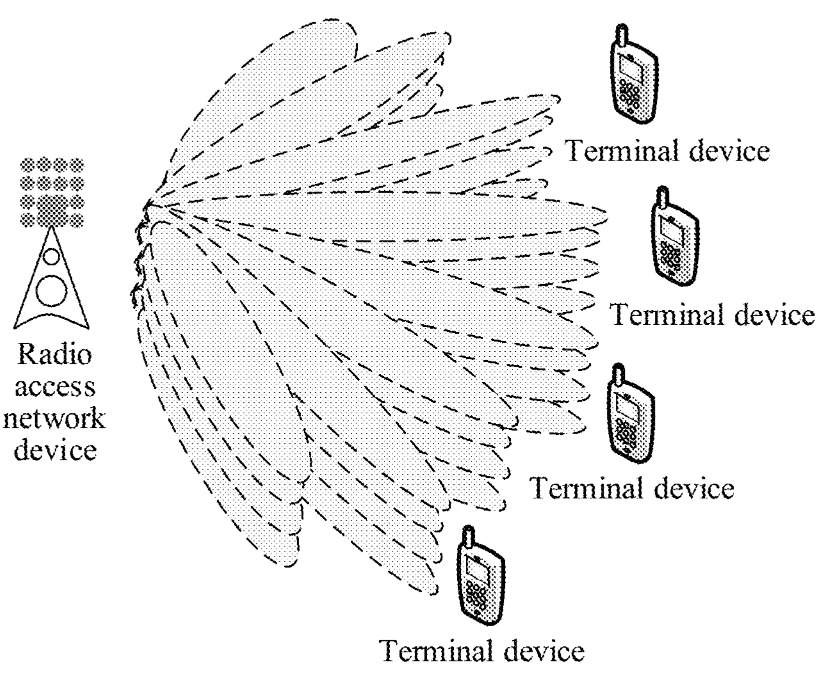
FIG. 3 is a diagram of beam space according to an embodiment of this application.

Beam space is space using RSRPs of a plurality of beams as coordinates. The beam space may be defined based on a plurality of static beams. FIG. 3 is a diagram of beam space according to an embodiment of this application. A static beam is a beam formed using a predefined weight during beamforming. For example, the static beam is a fixed beam formed in a cell, where a quantity of beams, a width, and a direction of the beam are definite. For example, a beam carrying a sounding reference signal (SRS) or a beam carrying a synchronization signal block (synchronization signal and PBCH block, SSB) are static beams, and a transmit direction of the static beam is based on a physical radio frequency (RF) parameter. When the physical RF parameter is definite, the beam space may be defined based on a plurality of static beams carrying the SRS or a plurality of static beams carrying the SSB.

The beam space in embodiments of this application is defined based on static beams. For example, the beam space is defined based on n (number of) beams carrying SRSs, and the n beams are a quantity of beams received by a beam antenna in this case. Alternatively, the beam space is defined based on n beams carrying SSBs, and the n beams are a quantity of beams received by a beam antenna in this case.

A grid identity (ID) identifies a grid in beam space or geographic space.

Figure 4:
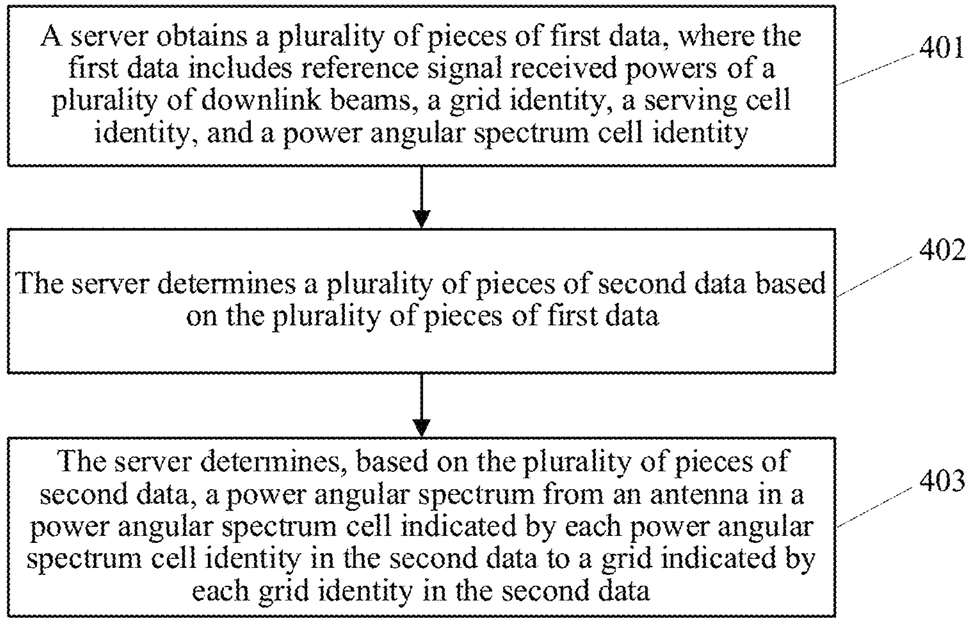
FIG. 4 is a flowchart of a method for determining radio channel multipath information according to an embodiment of this application.

FIG. 4 is a flowchart of a method for determining radio channel multipath information according to an embodiment of this application. The method is applied to a server including a radio channel modeling function, and includes the following steps.

401: A server obtains a plurality of pieces of first data, where the first data includes reference signal received powers of a plurality of downlink beams, a grid identity, a serving cell identity, and a power angular spectrum cell identity.

In an implementation, the server obtains the plurality of pieces of first data from a radio access network device. For example, the server obtains, from an MR data storage module of the radio access network device, CSI-RSRPs of a plurality of beams in each cell within a period of time, and a grid identity (also referred to as a grid ID) corresponding to RSRPs of downlink beams in each cell, a serving cell identity (also referred to as a serving cell ID), and a power angular spectrum cell identity (also referred to as a power angular spectrum cell ID). In other words, the RSRPs of the downlink beams in each cell are stored in association with the grid ID, the serving cell ID, and the power angular spectrum cell ID in MR data (which are the plurality of pieces of first data). For example, Table 1 is an MR data recording table according to an embodiment of this application. The MR data recording table includes a terminal device number (indicating terminal devices), an MR data number (indicating a plurality of pieces of MR data reported by terminal devices), a serving cell ID, a grid ID, a power angular spectrum cell ID, and RSRPs of a plurality of downlink beams. One row of data (that is, one piece of MR data) in Table 1 is one piece of first data. The plurality of pieces of first data obtained by the server from the radio access network device include a plurality of pieces of MR data measured by a plurality of terminal devices.

TABLE 1

MR data recording table

| Terminal device number | MR data number | Serving cell ID | Grid ID | Power angular spectrum cell ID | RSRP of a downlink beam (vector) |
|---|---|---|---|---|---|
| UE 1 | MR 1 | 3924752 | 134 | 3924752 | $RSRP_{(3924752, 134, 3924752}$ |
| | | 3924752 | 134 | 3924674 | $RSRP_{(3924752, 134, 3924674}$ |

TABLE 1-continued

| MR data recording table | | | | | |
|---|---|---|---|---|---|
| Terminal device number | MR data number | Serving cell ID | Grid ID | Power angular spectrum cell ID | RSRP of a downlink beam (vector) |
| | MR 2 | 3924752 | 135 | 3924752 | $RSRP_{(3924752, 135, 3924752}$ |
| UE 2 | MR 1 | 3924674 | 23 | 3924674 | $RSRP_{(3924674, 23, 3924674)}$ |
| . . . | . . . | . . . | . . . | . . . | . . . |

In Table 1, RSRP is a vector, and a quantity of dimensions is equal to a quantity of CSI-RS beams, that is, RSRP shown in Table 1 includes RSRPs of a plurality of beams. For example, UE 1 is located in an area whose grid ID is 134, and a serving cell ID and a power angular spectrum cell ID are both 3924752. The UE 1 obtains RSRPs of a plurality of CSI-RS beams in the current area. A RSRP measurement value of each CSI-RS beam and a quantity of CSI-RS beams form a matrix $RSRP_{(3924752,134,3924752)}$.

In a non-drive test scenario, a grid ID corresponding to an RSRP of a downlink beam in each cell is a grid ID of a grid included in beam space. The beam space is determined based on reference signal received powers of a plurality of uplink beams. For example, the radio access network device periodically measures SRS-RSRPs of a plurality of beams of each terminal device served by the radio access network device. The radio access network device determines, based on the beam space and SRS-RSRP measurement values of the plurality of beams of each terminal device, a grid ID that is in the beam space and that corresponds to each terminal device. In other words, the beam space formed by the RSRPs of the plurality of uplink beams may be similar to actual geographic space. The beam space is divided into a plurality of grids, and each grid has a respective grid ID. In addition, each terminal device served by the radio access network device also corresponds to a grid ID.

In another implementation, the server obtains the plurality of pieces of first data from a drive test device. For example, the server obtains, from a DT data recording module of the drive test device, RSRPs of a plurality of downlink beams measured by the terminal device within a period of time, a serving cell ID and a power angular spectrum cell ID that correspond to the measured RSRPs of the plurality of downlink beams, and latitude and longitude information of the terminal device during measurement. In other words, the RSRPs of the plurality of downlink beams measured by the terminal device are stored in DT data in association with the serving cell ID, the power angular spectrum cell ID, and the longitude and latitude information (which are the plurality of pieces of first data) of the terminal device during measurement. Table 2 is a DT data recording table according to an embodiment of this application. The DT data recording table includes a terminal device ID (indicating each terminal device), a DT data ID (indicating a plurality of pieces of DT data reported by terminal devices), a serving cell ID, a power angular spectrum cell ID, RSRPs of a plurality of downlink beams, and latitude and longitude information. It can be learned that, in comparison with the first data shown in Table 1, the latitude and longitude information is included in the first data shown in Table 2, and indicates a corresponding geographic grid. In other words, the latitude and longitude information in Table 2 is equivalent to indicating a grid ID of a geographic grid in which a terminal device is located.

TABLE 2

| DT data recording table | | | | | | |
|---|---|---|---|---|---|---|
| Terminal device number | DT data number | Serving cell ID | Power angular spectrum cell ID | RSRP of a downlink beam (vector) | Longitude | Latitude |
| UE 1 | DT 1 | 3924752 | 3924752 | $RSRP_{(3924752,3924752)}$ | 127.11 | 38.21 |
| | DT 2 | 3924752 | 3924752 | $RSRP_{(3924752,3924752)}$ | 127.18 | 38.25 |
| UE 2 | DT 1 | 3924674 | 3924674 | $RSRP_{(3924674,3924752)}$ | 127.22 | 38.30 |
| . . . | . . . | . . . | . . . | . . . | . . . | . . . |

The drive test device may determine, based on the latitude and longitude information of the terminal device during measurement, the grid ID corresponding to the terminal device during measurement. In other words, in a drive test scenario, grid IDs corresponding to the RSRPs of the plurality of downlink beams are identities of grids in geographic space. For example, the geographic space is three-dimensional space formed using the latitude and longitude information. For a group of given latitude and longitude information, the group of latitude and longitude information is mapped to a plane area of n meters by m meters (where n and m are positive integers), and the plane area is a grid.

402: The server determines a plurality of pieces of second data based on the plurality of pieces of first data.

Due to a large amount of data of the plurality of pieces of first data obtained by the server, to eliminate random interference fluctuation the server may further process the plurality of pieces of first data. The first data includes an identity of a power angular spectrum cell to which the terminal belongs. The power angular spectrum cell is a cell in which a downlink beam received by the terminal device is located. In other words, if the terminal device detects a RSRP of the downlink beam in the cell, the cell is the power angular spectrum cell of the terminal device. The power angular spectrum cell may be a serving cell, or may be a neighboring cell. For example, in the network scenario shown in FIG. 2, the cell 1 is a serving cell of the terminal device, and the cell 2 is a neighboring cell. The terminal device detects an RSRP of a downlink beam in the cell 1 and an RSRP of a downlink beam in the cell 2. In this case, both the cell 1 and the cell 2 are power angular spectrum cells of the terminal device. RSRPs of downlink beams in each cell are stored in association with a corresponding grid ID, a corresponding serving cell ID, and a corresponding power angular spectrum cell ID (which are the plurality of pieces of first data). For example, the terminal device is located in an area whose grid ID is 134, and a serving cell ID is 3924752. UE 1 obtains RSRPs of a plurality of CSI-RS beams in the current area. The terminal device can measure an RSRP of a CSI-RS beam of the serving cell 3924752 and an RSRP of a CSI-RS beam of a neighboring cell 3924674.

In an implementation, that the server determines the plurality of pieces of second data based on the grid ID, the serving cell ID, the power angular spectrum cell ID, and the RSRPs of the plurality of downlink beams that are included in the plurality of pieces of first data includes the following steps:

The server obtains RSRPs of a plurality of downlink beams with a same grid ID, a same serving cell ID, and a same power angular spectrum cell ID in the plurality of pieces of first data.

The server determines an eigenvalue of the RSRPs of the plurality of downlink beams with the same grid ID, the same serving cell ID, and the same power angular spectrum cell ID in the plurality of pieces of first data. The eigenvalue is any one of the following: an average value of the reference signal received powers of the plurality of downlink beams, a median of the reference signal received powers of the plurality of downlink beams, or a mode of the reference signal received powers of the plurality of downlink beams.

That is, the server obtains an eigenvalue of pieces of first data with a same grid ID, a same serving cell ID, and a same power angular spectrum cell ID, so that the amount of data can be reduced. The following uses an example in which the eigenvalue is the average value for description. Table 3 is a recording table of a plurality of pieces of first data according to an embodiment of this application. The plurality of pieces of first data may include a plurality of pieces of first data with a same grid ID, a same serving cell ID, and a same power angular spectrum cell ID, as shown in Table 3.

TABLE 3

Recording of a plurality of pieces of first data

| First data number | Serving cell ID | Grid ID | Power angular spectrum cell ID | RSRP of a downlink beam (vector) |
|---|---|---|---|---|
| 1 | 3924752 | 134 | 3924752 | $RSRP^1_{(3924752,\ 134,\ 3924752)}$ |
| 2 | 3924752 | 134 | 3924752 | $RSRP^2_{(3924752,\ 134,\ 3924752)}$ |
| 3 | 3924752 | 134 | 3924752 | $RSRP^3_{(3924752,\ 134,\ 3924752)}$ |
| 4 | 3924752 | 134 | 3924752 | $RSRP^4_{(3924752,\ 134,\ 3924752)}$ |
| 5 | 3924752 | 134 | 3924674 | $RSRP^1_{(3924752,\ 134,\ 3924674)}$ |
| 6 | 3924752 | 134 | 3924674 | $RSRP^2_{(3924752,\ 134,\ 3924674)}$ |
| . . . | . . . | . . . | . . . | . . . |

In Table 3, for the plurality of pieces of first data with the same grid ID, the same serving cell ID, and the same power angular spectrum cell ID, the server obtains an average value of RSRPs of CSI-RS beams. For example, in Table 3 there are four pieces of first data with a grid ID 134, a serving cell ID 3924752, and a power angular spectrum cell ID 3924752, and vectors of RSRPs of a plurality of beams included in the four pieces of first data are $$RSRP^1_{(3924752,134,3924752)},\ RSRP^2_{(3924752,134,3924752)},\ RSRP^3_{(3924752,134,3924752)} \text{ and } RSRP^4_{(3924752,134,3924752)}.$$

It is assumed that $$RSRP^1_{(3924752,134,3924752)}$$

in a piece of first data whose first data number is 1 is:

$$RSRP^1_{(3924752,134,3924752)} = [RSRP^1_0,\ 0,\ RSRP^1_2,\ \ldots\ ,\ RSRP^1_{30},\ RSRP^1_{31}],$$

which indicates RSRPs, measured in an area whose grid ID is 134 by the terminal device, of a plurality of beams of a base station whose serving cell ID is 3924752 and whose power angular spectrum cell ID is 3924752 (where a value in the vector being 0 indicates that no RSRP of a beam is measured). Similarly, $$RSRP^2_{(3924752,134,3924752)},\ RSRP^3_{(3924752,134,3924752)} \text{ and } RSRP^4_{(3924752,134,3924752)}$$

each include RSRPs of a plurality of beams, which are similar to that shown in the vector $$RSRP^1_{(3924752,134,3924752)}.$$

In this embodiment, it is assumed that each base station includes 32 beams. For a $k^{th}$ CSI-RS beam ($0 \le k \le 31$), an average value of RSRP values of the $k^{th}$ CSI-RS beam respectively in $$RSRP^1_{(3924752,134,3924752)},\ RSRP^2_{(3924752,134,3924752)},\ RSRP^3_{(3924752,134,3924752)}, \text{ and } RSRP^4_{(3924752,134,3924752)}$$

is denoted as $RSRP_k$. After an average value of RSRPs of beams in $$RSRP^1_{(3924752,134,3924752)} RSRP^2_{(3924752,134,3924752)},\ RSRP^3_{(3924752,134,3924752)}, \text{ and } RSRP^4_{(3924752,134,3924752)}$$

is obtained, the four pieces of first data may be combined into one piece of first data. The combined first data includes the grid ID 134, the serving cell ID 3924752, the power angular spectrum cell ID 3924752, and a vector $RSRP_{(3924752,134,3924752)}{}' = [RSRP_0,\ RSRP_1,\ RSRP_2,\ \ldots\ ,\ RSRP_{31}]$ of RSRPs of downlink beams.

403: The server determines, based on the plurality of pieces of second data, a power angular spectrum from an antenna in a power angular spectrum cell indicated by each power angular spectrum cell identity in the second data to a grid indicated by each grid identity in the second data.

The power angular spectrum is a form of the radio channel multipath information determined by the server. The power angular spectrum includes a path angle and path strength of a propagation path from the antenna in the power angular spectrum cell to the grid. The antenna in the power angular spectrum cell is an antenna for sending a downlink beam, and the antenna may be an antenna array.

The server determines, for each piece of second data in the plurality of pieces of second data based on the second data and cell configuration information of the power angular spectrum cell corresponding to the second data, the power angular spectrum from the power angular spectrum cell indicated by each power angular spectrum cell identity to the grid indicated by each grid identity. Step 403 includes the following procedures:

s11: The server determines a beam gain of each beam in the power angular spectrum cell based on an antenna gain of the power angular spectrum cell and an antenna port weight of each beam in the power angular spectrum cell.

s12: The server determines target path strength based on the beam gain of each beam in the power angular spectrum cell and the second data.

s13: The server determines, based on the target path strength, the power angular spectrum from the power angular spectrum cell indicated by the power angular spectrum cell identity to the grid indicated by the grid identity.

Both the antenna gain of the power angular spectrum cell and the antenna port weight (representing information of vertical angle information and horizontal angle information of each beam) of each beam in the power angular spectrum cell are recorded in an antenna file of the radio access network device. The server may obtain the foregoing information by obtaining the antenna file of the radio access network device, and determine the beam gain of each beam in the power angular spectrum cell based on the foregoing information. Beam gains of beams in the power angular spectrum cell in angle directions (for example, a horizontal angle and a vertical angle) may form a beam gain matrix.

Determining the target path strength by the server is actually solving a sparse optimization problem shown in Formula (1). By solving the sparse optimization problem, the server may obtain the target path strength (that is, a path strength matrix X in Formula (1)):

$$\min_{X}\left(\|X\|_1 + \lambda\|AX - RSRP\|_2^2\right) \tag{1}$$

where a quantity of dimensions of the path strength matrix X is the same as a quantity of horizontal and vertical discretization angles of each beam in the power angular spectrum cell. An element in an $i^{th}$ row and a $j^{th}$ column of X is $X_{i,j}$ and $X_{i,j}$ represents path strength (unit: dB) of a path indicated using an angular discretized horizontal direction i and vertical direction j, where $i \in [0, 359]$, $j \in [0,180]$. The $\lambda$ is a regular term coefficient. The A is a beam gain matrix, and represents abeam gain of each beam in each angle direction. The RSRP is a vector, and is obtained by normalizing statistical values of RSRPs of a plurality of beams in a linear domain so that an average value of the RSRPs is 1 W. It may be understood that one power angular spectrum cell corresponds to one path strength matrix X. Because RSRP is associated with a serving cell ID, a grid ID, and a power angular spectrum cell, it can be learned according to Formula (1) that the path strength matrix X is also associated with the serving cell ID, the grid ID, and the power angular spectrum cell.

After obtaining the path strength matrix X, the server may determine, based on X, the power angular spectrum from the power angular spectrum cell indicated by each power angular spectrum cell identity in the second data to the grid indicated by each grid identity. An implementation is as follows: the server obtains all non-zero elements in the path strength matrix X, where a total quantity of the non-zero elements is a quantity of paths. For each non-zero element (that is, each path), the server maps, to a path horizontal dimension angle and a path vertical dimension angle respectively (each measured in angles), the angular discretized horizontal direction i and the vertical direction i. In other words, a group of the path horizontal dimension angle and the path vertical dimension angle represents a path. For example, Table 4 is a power angular spectrum output table according to an embodiment of this application. Each row in Table 4 represents a path, and a power angular spectrum number indicates a power angular spectrum, and one power angular spectrum may include one or more paths.

TABLE 4

Power angular spectrum output

| Power angular spectrum number | Serving cell ID | Grid ID | Power angular spectrum cell ID | Path number | Path horizontal dimension angle | Path vertical dimension angle | Path strength |
|---|---|---|---|---|---|---|---|
| 1 | 3924752 | 134 | 3924752 | 1 | 5 | −2 | −91.2 |
| | 3924752 | 134 | 3924752 | 2 | 30 | 4 | −93.5 |
| 2 | 3924752 | 134 | 3924674 | 1 | 35 | −6 | −100.1 |
| | 3924752 | 134 | 3924674 | 2 | 0 | 8 | −104.6 |
| | 3924752 | 134 | 3924674 | 3 | −20 | 8 | −112.3 |
| 3 | 3924752 | 135 | 3924752 | 1 | 6 | 2 | −90 |
| 4 | 3924674 | 23 | 3924674 | 1 | 35 | −6 | −100 |
| | 3924674 | 23 | 3924674 | 2 | 0 | 8 | −104 |
| | 3924674 | 23 | 3924674 | 3 | −20 | 8 | −112 |
| . . . | . . . | . . . | . . . | . . . | . . . | . . . | . . . |

It can be learned that the server may model a radio channel multipath model (including propagation paths of a plurality of beams) based on the power angular spectrum shown in Table 4. In addition, the radio channel multipath model that is modeled based on the power angular spectrum does not depend on map information, latitude and longitude of a base station, a height of the base station, a physical downtilt and azimuth information of an antenna, and the like, so that the radio channel multipath model modeled by the server has higher accuracy.

Optionally, the server optimizes the power angular spectrum determined in step 403, to reduce a data volume and obtain a simpler radio channel multipath model. After step 403, the server may further combine grids that have different serving cell identities and at least one same power angular spectrum cell identity in the power angular spectrum. An implementation may include the following steps:

s21: The server obtains a distance between any two of at least two grids that have different serving cell identities and at least one same power angular spectrum cell identity in the power angular spectrum, where the distance is determined based on a quantity of overlapping cells, the power angular spectrum from the power angular spectrum cell to the grid, and a distance measurement parameter.

s22: The server combines, into one grid, two grids between which a distance is less than a specified threshold in the grids that have the different serving cell identities and the at least one same power angular spectrum cell identity in the power angular spectrum.

The server determines, based on the serving cell ID and the power angular spectrum cell ID, grids that may need to be combined. In this embodiment, every two grids are compared. If two grids have different serving cell IDs and at least one same power angular spectrum cell ID, the two grids may need to be combined. For example, the power angular spectrum shown in Table 4 includes a grid whose grid ID is 134 and a grid whose grid ID is 23. The two grids correspond to different serving cell IDs, and power angular spectrum cell IDs corresponding to the two grid IDs are both 3924674. The grid whose grid ID is 134 and the grid whose grid ID is 23 may need to be combined. Further, the server calculates a distance between any two of the grids that may need to be combined, and defines a distance D between any two grids, as shown in Formula (2).

$$D_{m,n} = \frac{1 + \alpha\sum_{k=1}^{S} W(PAS_{k,m}, PAS_{k,n})}{S} \quad (2)$$

where m and n represent grid IDs of two different grids, a is a distance measurement parameter (a positive value), and k represents a power angular spectrum cell ID. The S represents a quantity of overlapping cells in the power angular spectrum, where the quantity of overlapping cells is a quantity of times that a case in which there are different serving cell identities and at least one same power angular spectrum cell identity in the power angular spectrum occurs. The W indicates a Wasserstein distance. The $PAS_{k,m}$ indicates a power angular spectrum from a cell k to a grid m. The distance between any two grids may alternatively be a Euclidean distance or another distance in beam space or geographic space. This is not limited in embodiments of this application.

For example, the grid whose grid ID is 134 and the grid whose grid ID is 23 each have a power angular spectrum in a cell whose power angular spectrum cell ID is 3924674. Therefore, the parameter S in Formula (2) is 1. A distance between the two grids is $D_{134,23}=1+\alpha W(PAS_{3924674,134}, PAS_{3924674,23})$.

In a case, for example, in the power angular spectrum shown in Table 4, if there are the grid ID 134 and the grid ID 23, there is another case in which there are corresponding different serving cell IDs and a corresponding same power angular spectrum cell ID. It is assumed that after a period of time, a serving cell ID corresponding to the grid ID 134 is 3924674, and a serving cell ID corresponding to the grid ID 23 is 3924752, that is, corresponding serving cell IDs are different. A power angular spectrum cell ID corresponding to the grid ID 134 is 3924674, and a power angular spectrum cell ID corresponding to the grid ID 24 is 3924674, that is, corresponding power angular spectrum cell IDs are the same. In this case, a quantity of overlapping cells is 2, and it indicates that the case in which there are different serving cell identities and at least one same power angular spectrum in the power angular spectrum occurs twice.

The server uses a clustering algorithm for a specified threshold to cluster, based on the distance between the any two grids, the grids that need to be combined, so that the distance between the any two grids in each type is less than the specified threshold. For the clustering algorithm used in this embodiment, refer to calculation of an existing clustering algorithm. This is not limited in this embodiment. Each type obtained through clustering is a combined grid, and a power angular spectrum from the combined grid to each cell is one power angular spectrum.

This embodiment of this application provides the method for determining radio channel multipath information. The server obtains the reference signal received powers of the plurality of downlink beams, to determine the radio channel multipath information from the power angular spectrum cell to the grid based on the association relationship between the reference signal received powers of the plurality of downlink beams and the following: the grid identity, the serving cell identity, and the power angular spectrum cell identity. It can be learned that the server models a radio channel based on the reference signal received powers of the plurality of downlink beams, instead of depending on map and engineering parameter information. This helps improve accuracy of radio channel modeling.

Figure 5A:
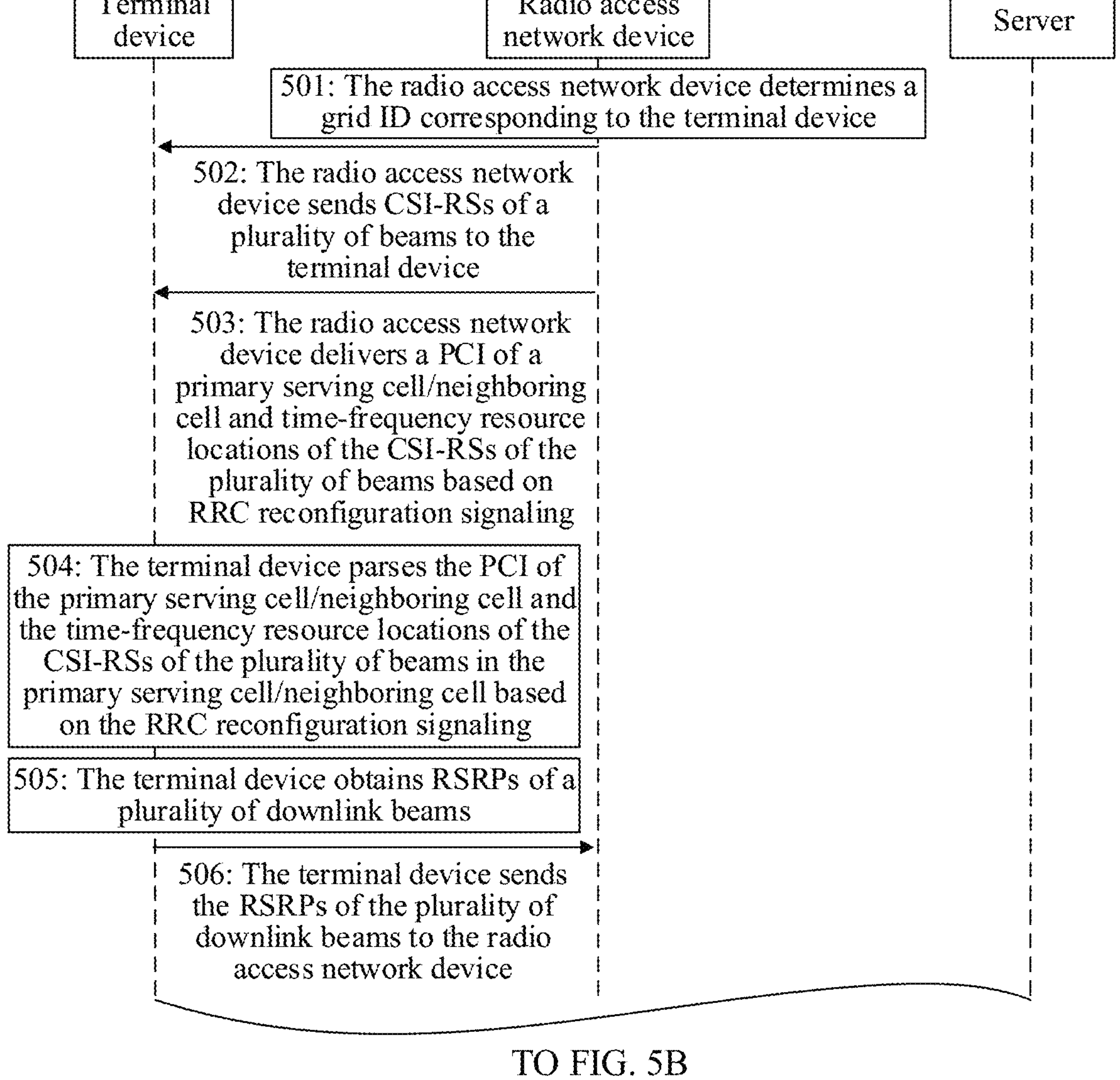

FIG. 5A and FIG. 5B are a flowchart of a method for determining radio channel multipath information in a non-drive test scenario according to an embodiment of this application. The method is implemented through interaction between a terminal device, a radio access network device, and a server. The method includes the following steps.

501: The radio access network device determines a grid ID corresponding to the terminal device.

The radio access network device obtains description information of beam space of each cell managed by the radio access network device. The description information of the beam space of each cell includes but is not limited to: dimensions of the beam space (that is, a quantity of beams), beam IDs of a plurality of beams in the beam space, different level values corresponding to a same beam, and/or the like.

The radio access network device periodically measures SRS-RSRPs of a plurality of uplink beams of the terminal device that accesses the radio access network device, and determines, based on the description information of the beam space and measured values of the SRS-RSRPs of the plurality of uplink beams of the terminal device, the grid ID that is in the beam space and that corresponds to the terminal device. For example, the radio access network device determines, based on the beam IDs of the plurality of beams measured by the terminal device in the beam space and the measured values of the SRS-RSRPs of the plurality of beams measured by the terminal device, the grid ID that is in the beam space and that corresponds to the terminal device.

502: The radio access network device sends CSI-RSs of a plurality of beams to the terminal device, where the beams point to different directions; and correspondingly, the terminal device receives the CSI-RSs of the plurality of beams.

TABLE 5

Time-frequency resource locations of CSI-RSs of a plurality of beams in RRC reconfiguration signaling

| Cell ID | Number of PRBs | Start PRB | Density | CSI-RS index | Slotconfig | Frequency domain allocation | First OFDM symbol in time domain |
|---|---|---|---|---|---|---|---|
| 654 | 48 | 4 | 1 | 0 | ms40: 13 | 1 | 13 |
| 654 | 48 | 4 | 1 | 1 | ms40: 13 | 2 | 13 |
| 654 | 48 | 4 | 1 | 2 | ms40: 13 | 4 | 13 |
| 654 | 48 | 4 | 1 | 3 | ms40: 13 | 8 | 13 |
| 654 | 48 | 4 | 1 | 4 | ms40: 13 | 1 | 12 |
| . . . | . . . | . . . | . . . | . . . | . . . | . . . | . . . |
| 655 | 48 | 4 | 1 | 0 | ms40: 13 | 1 | 13 |
| . . . | . . . | . . . | . . . | . . . | . . . | . . . | . . . |

TABLE 6

Meanings of fields of time-frequency resource location information of CSI-RSs of a plurality of beams in RRC reconfiguration signaling

| Field | Meaning |
|---|---|
| Cell ID | PCI of a primary serving cell/neighboring cell |
| Number of PRBs | Quantity of physical resource blocks (physical resource block, PRB) occupied by a CSI-RS in a sending slot |
| Start PRB | Start position of a PRB occupied by a CSI-RS in a sending slot |
| Density | Quantity of resource elements (resource elements, REs) occupied in a PRB occupied by a CSI-RS |
| CSI-RS index | CSI-RS beam number |
| Slotconfig | CSI-RS sending periodicity and slot number sent in the periodicity |
| Frequency domain allocation | Subcarrier number of an RE occupied in a PRB sent using a CSI-RS |
| First OFDM symbol in time domain | OFDM symbol number of an RE occupied in a PRB sent |
| Field | Meaning |
| | using a CSI-RS |

503: The radio access network device delivers physical cell identifiers (PCIs) of a serving cell (also referred to as a primary serving cell) and a neighboring cell (also referred to as a neighboring cell, which are briefly referred to as primary serving cell/neighboring cell hereinafter) and time-frequency resource locations of the CSI-RSs of the plurality of beams based on radio resource control (radio RRC) reconfiguration signaling. Correspondingly, the terminal device receives the RRC reconfiguration signaling.

The radio access network device periodically delivers the CSI-RSs of the plurality of beams and the RRC reconfiguration signaling.

504: The terminal device parses the PCI of the primary serving cell/neighboring cell and the time-frequency resource locations of the CSI-RSs of the plurality of beams in the primary serving cell/neighboring cell based on the RRC reconfiguration signaling.

For example, Table 5 illustrates time-frequency resource locations of CSI-RSs of a plurality of beams in RRC reconfiguration signaling according to an embodiment of this application. Each row in Table 5 represents time-frequency resource location information of a CSI-RS of one beam in one cell. For the meaning of each column in Table 5, refer to Table 6. Table 6 illustrates meanings of fields of time-frequency resource location information of CSI-RSs of a plurality of beams in RRC reconfiguration signaling.

It can be learned that the terminal device may determine the time-frequency resource locations of the CSI-RSs of the plurality of beams in the primary serving cell/neighboring cell based on the RRC reconfiguration signaling.

505: The terminal device obtains RSRPs of a plurality of downlink beams.

In an implementation, the terminal device may periodically measure CSI-RSRPs of the received CSI-RS signals of the plurality of beams at the time-frequency resource locations of the CSI-RSs of the plurality of beams in the primary serving cell/neighboring cell based on the RRC reconfiguration signaling.

In another implementation, the terminal device may further receive the grid ID corresponding to the terminal device. The grid ID indicates the terminal device to measure and report the RSRPs of the plurality of downlink beams upon change of the grid ID. The terminal device receives information carried in a physical downlink control channel (PDCCH), where the information carried in the PDCCH includes a grid ID, and the grid ID is associated with the terminal device.

When the terminal device determines to access a new cell or the terminal device determines that the grid ID changes, the terminal device measures the CSI-RSRPs of the received CSI-RS signals of the plurality of beams at the time-frequency resource locations of the CSI-RSs of the plurality of beams in the primary serving cell/neighboring cell based on the RRC reconfiguration signaling. It can be learned that the terminal device re-measures the CSI-RSRPs of the CSI-RS signals of the plurality of beams after determining to access the new cell or determining that the grid ID changes. This helps reduce uplink communication overheads from the terminal device to the radio access network device, and reduce energy consumption of the terminal device.

506: The terminal device sends the RSRPs of the plurality of downlink beams to the radio access network device; and correspondingly, the radio access network device receives the RSRPs of the plurality of downlink beams from the terminal device.

507: The radio access network device stores the RSRPs of the plurality of downlink beams in association with the grid ID, a serving cell ID, and a power angular spectrum cell ID.

The radio access network device associates, with the grid identity and the serving cell identity, the reference signal received powers of the plurality of downlink beams reported by the terminal device, and stores the reference signal received powers in MR data.

508: The server obtains a plurality of pieces of first data from the radio access network device, where the first data includes the reference signal received powers of the plurality of downlink beams, the grid identity, the serving cell identity, and the power angular spectrum cell identity.

509: The server determines a plurality of pieces of second data based on the plurality of pieces of first data. The second data includes an eigenvalue of reference signal received powers of a plurality of downlink beams with a same grid identity, a same serving cell identity, and a same power angular spectrum cell identity in the plurality of pieces of first data.

510: The server determines, based on the plurality of pieces of second data, a power angular spectrum from an antenna in a power angular spectrum cell indicated by each power angular spectrum cell identity in the second data to a grid indicated by each grid identity in the second data.

For an implementation of steps 508 to 510, refer to corresponding descriptions in steps 401 to 403 in the embodiment of FIG. 4. Details are not described herein.

Optionally, after step 510, the method for determining radio channel multipath information in this embodiment further includes the following step 511: the server combines grids that have different serving cell identities and at least one same power angular spectrum cell identity in the power angular spectrum. For an implementation, refer to corresponding descriptions in the embodiment of FIG. 4. Details are not described herein.

This embodiment of this application provides the method for determining radio channel multipath information in the non-drive test scenario. In the method, the radio access network device determines the grid ID that is in beam space and that corresponds to the terminal device, and associates, with the grid ID in the beam space, the RSRPs of a plurality of downlink beams reported by the terminal device. It can be learned that the radio access network device does not need to collect latitude and longitude information of the terminal device, and may be used in a scenario in which positioning of the terminal device is difficult. In addition, a privacy security problem of the terminal device is also resolved. The server obtains the RSRPs of the plurality of downlink beams from the radio access network device, where the RSRPs of the plurality of downlink beams are associated with the grid ID and the serving cell ID. The server determines the radio channel multipath information based on the RSRPs of the plurality of downlink beams, the grid ID, the serving cell ID, and the power angular spectrum cell ID. It can be learned that the server may determine the radio channel multipath information based on the RSRPs of the plurality of beams, instead of depending on map information, and latitude and longitude information, a site height, a physical downtilt, an azimuth, and the like of the radio access network device. This helps improve accuracy of modeling a radio channel by the server.

Figure 6A:
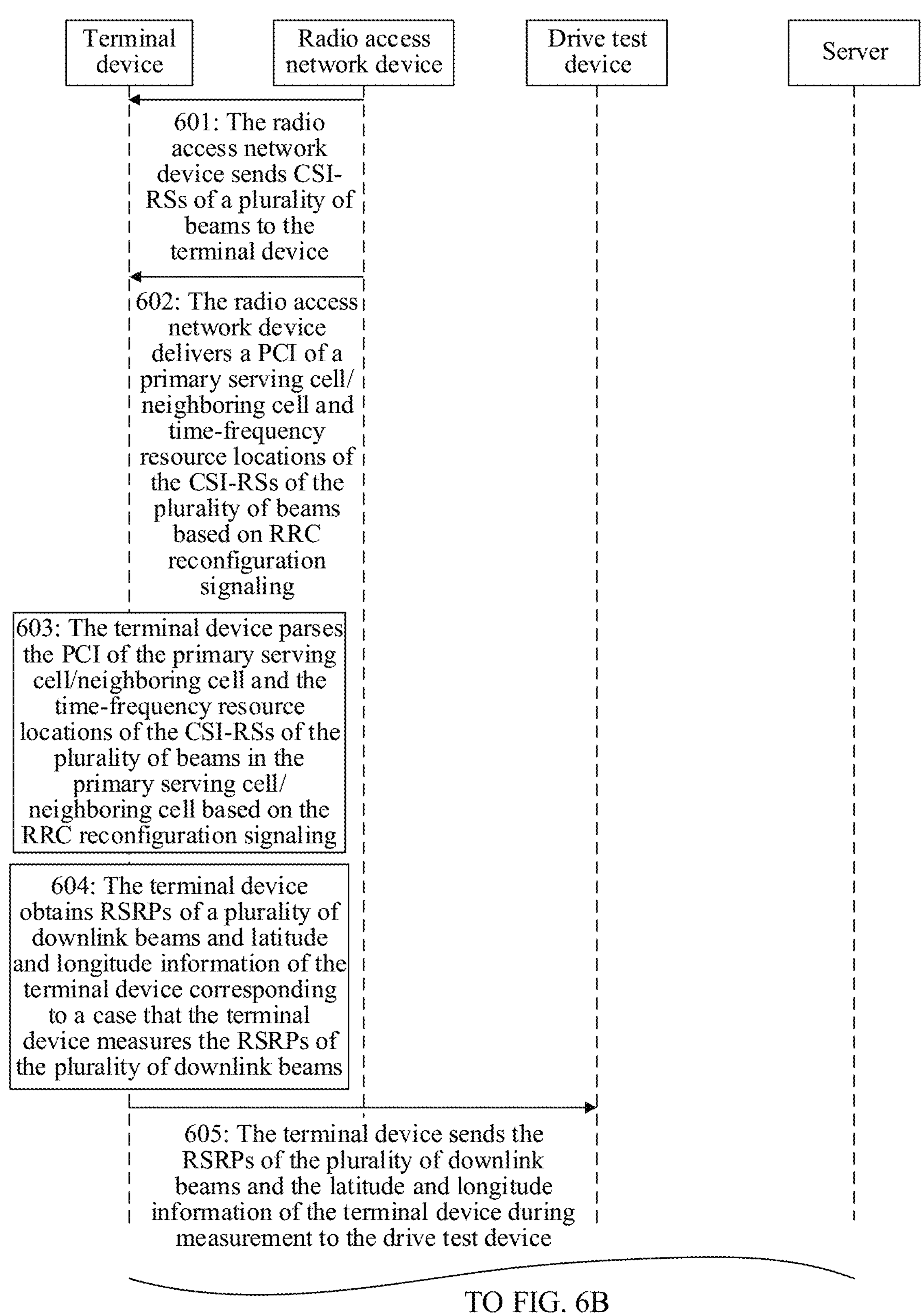

FIG. 6A and FIG. 6B are a flowchart of a method for determining radio channel multipath information in a drive test scenario according to an embodiment of this application. The method is implemented through interaction between a terminal device, a radio access network device, a drive test device, and a server. In this embodiment, it is assumed that the drive test device and the terminal device are separately deployed. The method includes the following steps.

601: The radio access network device sends CSI-RSs of a plurality of beams to the terminal device, where the beams point to different directions; and correspondingly, the terminal device receives the CSI-RSs of the plurality of beams.

602: The radio access network device delivers physical cell identifiers (PCIs) of a serving cell (also referred to as a primary serving cell) and a neighboring cell (also referred to as a neighboring cell, which are briefly referred to as primary serving cell/neighboring cell hereinafter) and time-frequency resource locations of the CSI-RSs of the plurality of beams based on radio resource control (RRC) reconfiguration signaling. Correspondingly, the terminal device receives the RRC reconfiguration signaling.

603: The terminal device parses the PCI of the primary serving cell/neighboring cell and the time-frequency resource locations of the CSI-RSs of the plurality of beams in the primary serving cell/neighboring cell based on the RRC reconfiguration signaling.

For an implementation of steps 601 to 603 in this embodiment, refer to corresponding descriptions in steps 502 to 504 in the embodiment of FIG. 5A. Details are not described herein.

604: The terminal device obtains RSRPs of a plurality of downlink beams and latitude and longitude information of the terminal device corresponding to a case that the terminal device measures the RSRPs of the plurality of downlink beams.

The terminal device may periodically measure CSI-RSRPs of the received CSI-RS signals of the plurality of beams at the time-frequency resource locations of the CSI-RSs of the plurality of beams in the primary serving cell/neighboring cell based on the RRC reconfiguration signaling. In addition, when periodically measuring the CSI-RSRPs of the CSI-RS signals of the plurality of beams, the terminal device further needs to record the latitude and longitude information of the terminal device during measurement. The CSI-RSRPs of the plurality of beams measured by the terminal device are associated with the latitude and longitude information during the measurement.

605: The terminal device sends the RSRPs of the plurality of downlink beams and the latitude and longitude information of the terminal device during the measurement to the drive test device; and correspondingly, the drive test device receives the RSRPs of the plurality of downlink beams and the latitude and longitude information of the terminal device during the measurement.

606: The drive test device determines, based on the latitude and longitude information of the terminal during the measurement, a grid ID corresponding to the terminal during the measurement.

It should be noted that step 606 may alternatively be performed by the server, or may be performed by the terminal device before the terminal device performs reporting to the radio access network device. This is not limited in this embodiment. When the terminal device determines, based on the latitude and longitude information of the terminal during the measurement, the grid ID corresponding to the terminal during the measurement, the terminal sends measured values of the CSI-RSRPs of the plurality of beams and the grid ID to the drive test device.

An implementation of the step of determining, based on the latitude and longitude information of the terminal during the measurement, the grid ID corresponding to the terminal during the measurement includes: geographic space is three-dimensional space formed using the latitude and longitude information. When a group of latitude and longitude information is given, the group of latitude and longitude information is mapped to a plane area of n meters by m meters (where n and m are positive integers), and the plane area is a grid. Then, the corresponding grid ID may be determined based on the latitude and longitude information.

607: The drive test device stores the RSRPs of the plurality of downlink beams in association with the grid ID, a serving cell ID, and a power angular spectrum cell ID.

The drive test device associates, with the grid ID, the serving cell ID, and the power angular spectrum cell ID, the RSRPs of the plurality of downlink beams reported by the terminal device, and stores the RSRPs in DT data.

608: The server obtains a plurality of pieces of first data from the drive test device, where the first data includes the reference signal received powers of the plurality of downlink beams, the grid identity, the serving cell identity, and the power angular spectrum cell identity.

609: The server determines a plurality of pieces of second data based on the plurality of pieces of first data. The second data includes an eigenvalue of reference signal received powers of a plurality of downlink beams with a same grid identity, a same serving cell identity, and a same power angular spectrum cell identity in the plurality of pieces of first data.

610: The server determines, based on the plurality of pieces of second data, a power angular spectrum from an antenna in a power angular spectrum cell indicated by each power angular spectrum cell identity in the second data to a grid indicated by each grid identity in the second data.

For an implementation of steps 608 to 610, refer to corresponding descriptions in steps 401 to 403 in the embodiment of FIG. 4. Details are not described herein.

Optionally, after step 610, the method for determining radio channel multipath information in this embodiment further includes the following step 611: the server combines grids that have different serving cell identities and at least one same power angular spectrum cell identity in the power angular spectrum. For an implementation, refer to corresponding descriptions in the embodiment of FIG. 4. Details are not described herein.

This embodiment of this application provides the method for determining radio channel multipath information in the drive test scenario. In the method, the drive test device receives the RSRPs of the plurality of downlink beams measured and reported by the terminal device, and associates the RSRPs of the plurality of downlink beams with the grid ID, the serving cell ID, and the power angular spectrum cell ID. The server obtains the RSRPs of the plurality of downlink beams from the drive test device, and determines the radio channel multipath information based on the RSRPs of the plurality of downlink beams, the grid ID, the serving cell ID, and the power angular spectrum cell ID. It can be learned that the server determines the radio channel multipath information based on the RSRPs of the plurality of downlink beams, instead of depending on map information and latitude and longitude information, a site height, a physical downtilt, an azimuth, and the like of the radio access network device. This helps improve accuracy of modeling a radio channel by the server.

The foregoing describes in detail the method for determining radio channel multipath information in embodiments of this application with reference to FIG. 1 to FIG. 6B. With reference to FIG. 7 to FIG. 10, the following describes in detail an apparatus for determining radio channel multipath information and a related device in embodiments of this application. It should be understood that the apparatus for determining radio channel multipath information and the related device that are shown in FIG. 7 to FIG. 10 can implement one or more steps in the method procedures shown in FIG. 1 to FIG. 6B. To avoid repetitions, details are not described herein.

Figure 7:
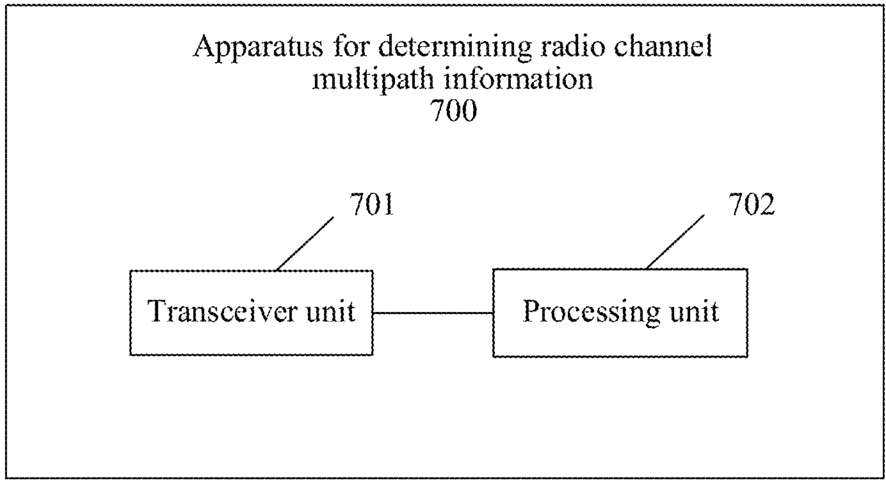
FIG. 7 is a diagram of an apparatus for determining radio channel multipath information according to an embodiment of this application.

FIG. 7 is a diagram of an apparatus 700 for determining radio channel multipath information according to an embodiment of this application. The apparatus 700 for determining radio channel multipath information shown in FIG. 7 is configured to implement the method performed by the server in embodiments shown in FIG. 1 to FIG. 6B. The apparatus 700 for determining radio channel multipath information includes a transceiver unit 701 and a processing unit 702. The transceiver unit 701 is configured to obtain a plurality of pieces of first data. The first data includes reference signal received powers of a plurality of downlink beams, a grid identity, a serving cell identity, and a power angular spectrum cell identity. The processing unit 702 is configured to determine a plurality of pieces of second data based on the plurality of pieces of first data. The second data includes an eigenvalue of reference signal received powers of a plurality of downlink beams with a same grid identity, a same serving cell identity, and a same power angular spectrum cell identity in the plurality of pieces of first data. The processing unit 702 is further configured to determine, based on the plurality of pieces of second data, a power angular spectrum from an antenna in a power angular spectrum cell indicated by each power angular spectrum cell identity in the second data to a grid indicated by each grid identity in the second data. The power angular spectrum cell is a cell in which a downlink beam received by a terminal device located in the grid is located, and the power angular spectrum includes a path angle and path strength of a propagation path from the antenna in the power angular spectrum cell to the grid.

In an implementation, the grid identity is a grid identity of a grid included in beam space, the beam space is determined based on reference signal received powers of a plurality of uplink beams, and the beam space corresponds to one or more cells. The cell is a serving cell or a power angular spectrum cell.

In an implementation, the grid identity is an identity of a grid in geographic space, the geographic space is determined based on latitude and longitude information of the terminal device corresponding to a case that the terminal device measures the reference signal received powers of the plurality of downlink beams in one or more cells, and the geographic space corresponds to one or more cells. The cell is a serving cell or a power angular spectrum cell.

In an implementation, that the processing unit 702 is configured to determine a plurality of pieces of second data based on the plurality of pieces of first data includes:

obtaining the reference signal received powers of the plurality of downlink beams with the same grid identity, the same serving cell identity, and the same power angular spectrum cell identity in the plurality of pieces of first data; and determining the eigenvalue of the reference signal received powers of the plurality of downlink beams with the same grid identity, the same serving cell identity, and the same power angular spectrum cell identity in the plurality of pieces of first data, where the eigenvalue is any one of the following: an average value of the reference signal received powers of the plurality of downlink beams, a median of the reference signal received powers of the plurality of downlink beams, or a mode of the reference signal received powers of the plurality of downlink beams.

In an implementation, that the processing unit 702 is configured to determine, based on the plurality of pieces of second data, a power angular spectrum from an antenna in a power angular spectrum cell indicated by each power angular spectrum cell identity in the second data to a grid indicated by each grid identity in the second data includes:

determining a beam gain of each beam in the power angular spectrum cell based on an antenna gain of the power angular spectrum cell and an antenna port weight of each beam in the power angular spectrum cell;

determining target path strength based on the beam gain of each beam in the power angular spectrum cell and the second data; and determining, based on the target path strength, the power angular spectrum from the antenna in the power angular spectrum cell indicated by the power angular spectrum cell identity to the grid indicated by the grid identity.

In an implementation, the processing unit 702 is further configured to combine grids that have different serving cell identities and at least one same power angular spectrum cell identity in the power angular spectrum.

In an implementation, that the processing unit 702 is configured to combine grids that have different serving cell identities and at least one same power angular spectrum cell identity in the power angular spectrum includes:

obtaining a distance between any two of at least two grids that have different serving cell identities and at least one same power angular spectrum cell identity in the power angular spectrum, where the distance is determined based on a quantity of overlapping cells, the power angular spectrum from the antenna in the power angular spectrum cell to the grid, and a distance measurement parameter; and combining, into one grid, two grids between which a distance is less than a specified threshold in the at least two grids that have the different serving cell identities and the at least one same power angular spectrum cell identity in the power angular spectrum.

Figure 8:
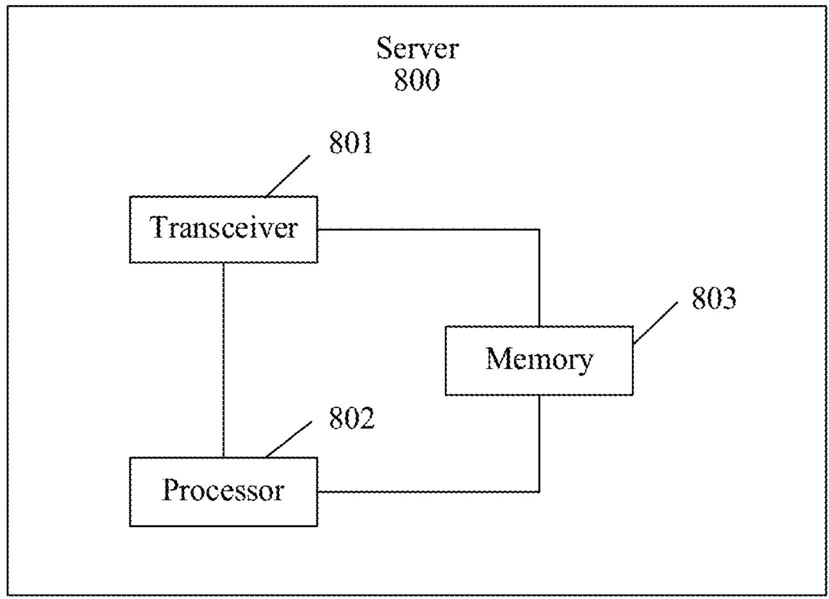
FIG. 8 is a diagram of a server according to an embodiment of this application.

In an implementation, related functions implemented by units in FIG. 7 may be implemented using a transceiver and a processor. FIG. 8 is a diagram of a server 800 according to an embodiment of this application. The server 800 may be a device (for example, a chip) that can perform the method for determining radio channel multipath information provided in embodiments of this application. The server 800 may include a transceiver 801, at least one processor 802, and a memory 803. The transceiver 801, the processor 802, and the memory 803 may be connected to each other through one or more communication buses, or may be connected to each other in another manner.

The transceiver 801 may be configured to send data or receive data. It may be understood that the transceiver 801 is a general term, and may include a receiver and a transmitter.

The processor 802 may be configured to process data of the server. The processor 802 may include one or more processors. For example, the processor 802 may be one or more central processing units (CPUs), a network processor (NP), a hardware chip, or any combination thereof. When the processor 802 is one CPU, the CPU may be a single-core CPU, or may be a multi-core CPU.

The memory 803 is configured to store program code and the like. The memory 803 may include a volatile memory, for example, a random access memory (RAM). Alternatively, the memory 803 may include a non-volatile memory (non-volatile memory), for example, a read-only memory (ROM), a flash memory, a hard disk drive (HDD), or a solid-state drive (SSD). Alternatively, the memory 803 may include a combination of the foregoing types of memories.

The processor 802 and the memory 803 may be coupled via an interface, or may be integrated together. This is not limited in this embodiment.

The transceiver 801 and the processor 802 may be configured to perform the method for determining radio channel multipath information provided in embodiments of this application. An implementation is as follows.

The transceiver 801 is configured to obtain a plurality of pieces of first data, where the first data includes reference signal received powers of a plurality of downlink beams, a grid identity, a serving cell identity, and a power angular spectrum cell identity.

The processor 802 is configured to determine a plurality of pieces of second data based on the plurality of pieces of first data, where the second data includes an eigenvalue of reference signal received powers of a plurality of downlink beams with a same grid identity, a same serving cell identity, and a same power angular spectrum cell identity in the plurality of pieces of first data.

The processor 802 is further configured to determine, based on the plurality of pieces of second data, a power angular spectrum from an antenna in a power angular spectrum cell indicated by each power angular spectrum cell identity in the second data to a grid indicated by each grid identity in the second data, where the power angular spectrum cell is a cell in which a downlink beam received by a terminal device located in the grid is located, and the power angular spectrum includes a path angle and path strength of a propagation path from the antenna in the power angular spectrum cell to the grid.

In an implementation, the grid identity is a grid identity of a grid included in beam space, the beam space is determined based on reference signal received powers of a plurality of uplink beams, and the beam space corresponds to one or more cells. The cell is a serving cell or a power angular spectrum cell.

In an implementation, the grid identity is a grid identity of geographic space, the geographic space is determined based on latitude and longitude information of the terminal device corresponding to a case that the terminal device measures the reference signal received powers of the plurality of downlink beams in one or more cells, and the geographic space corresponds to one or more cells. The cell is a serving cell or a power angular spectrum cell.

In an implementation, that the processor 802 is configured to determine a plurality of pieces of second data based on the plurality of pieces of first data includes:

- obtaining the reference signal received powers of the plurality of downlink beams with the same grid identity, the same serving cell identity, and the same power angular spectrum cell identity in the plurality of pieces of first data; and
- determining the eigenvalue of the reference signal received powers of the plurality of downlink beams with the same grid identity, the same serving cell identity, and the same power angular spectrum cell identity in the plurality of pieces of first data, where the eigenvalue is any one of the following: an average value of the reference signal received powers of the plurality of downlink beams, a median of the reference signal received powers of the plurality of downlink beams, or a mode of the reference signal received powers of the plurality of downlink beams.

In an implementation, that the processor 802 is configured to determine, based on the plurality of pieces of second data, a power angular spectrum from an antenna in a power angular spectrum cell indicated by each power angular spectrum cell identity in the second data to a grid indicated by each grid identity in the second data includes:

- determining a beam gain of each beam in the power angular spectrum cell based on an antenna gain of the power angular spectrum cell and an antenna port weight of each beam in the power angular spectrum cell;
- determining target path strength based on the beam gain of each beam in the power angular spectrum cell and the second data; and
- determining, based on the target path strength, the power angular spectrum from the antenna in the power angular spectrum cell indicated by the power angular spectrum cell identity to the grid indicated by the grid identity.

In an implementation, the processor 802 is further configured to combine grids that have different serving cell identities and at least one same power angular spectrum cell identity in the power angular spectrum.

In an implementation, that the processor 802 is configured to combine grids that have different serving cell identities and at least one same power angular spectrum cell identity in the power angular spectrum includes:

- obtaining a distance between any two of at least two grids that have different serving cell identities and at least one same power angular spectrum cell identity in the power angular spectrum, where the distance is determined based on a quantity of overlapping cells, the power angular spectrum from the antenna in the power angular spectrum cell to the grid, and a distance measurement parameter; and
- combining, into one grid, two grids between which a distance is less than a specified threshold in the at least two grids that have the different serving cell identities and the at least one same power angular spectrum cell identity in the power angular spectrum.

It may be understood that the foregoing method embodiments may be cited in the apparatus for determining radio channel multipath information and the server that are shown in FIG. 7 and FIG. 8. For beneficial effects that can be implemented, refer to corresponding descriptions in the foregoing method embodiments. Details are not described herein.

Figure 9:
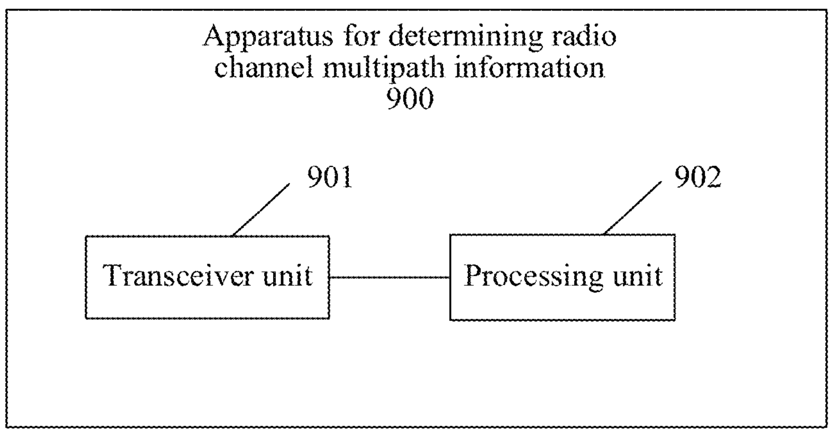
FIG. 9 is a diagram of an apparatus for determining radio channel multipath information according to an embodiment of this application.

FIG. 9 is a diagram of an apparatus 900 for determining radio channel multipath information according to an embodiment of this application. The apparatus 900 for determining radio channel multipath information shown in FIG. 9 is configured to implement the method performed by the radio access network device in embodiments shown in FIG. 1 to FIG. 6B. The apparatus 900 for determining radio channel multipath information includes a transceiver unit 901 and a processing unit 902. The transceiver unit 901 is configured to receive reference signal received powers of a plurality of downlink beams from a terminal device. The processing unit 902 is configured to determine a plurality of pieces of first data. The first data includes the reference signal received powers of the plurality of downlink beams, a grid identity, a serving cell identity, and a power angular spectrum cell identity. The plurality of pieces of first data are used to determine a plurality of pieces of second data. The second data includes an eigenvalue of reference signal received powers of a plurality of downlink beams with a same grid identity, a same serving cell identity, and a same power angular spectrum cell identity in the plurality of pieces of first data. The plurality of pieces of second data are used to determine a power angular spectrum from an antenna in a power angular spectrum cell indicated by each power angular spectrum cell identity in the second data to a grid indicated by each grid identity in the second data. The power angular spectrum cell is a cell in which a downlink beam received by the terminal device located in the grid is located, and the power angular spectrum includes a path angle and path strength of a propagation path from the antenna in the power angular spectrum cell to the grid.

In an implementation, the transceiver unit 901 is further configured to send the grid identity to the terminal device. The grid identity indicates the terminal device to measure and report the reference signal received powers of the plurality of downlink beams upon change of the grid identity.

In an implementation, the grid identity is a grid identity of a grid included in beam space, the beam space is determined based on reference signal received powers of a plurality of uplink beams, and the beam space corresponds to one or more cells. The cell is a serving cell or a power angular spectrum cell.

In an implementation, the grid identity is a grid identity of geographic space, the geographic space is determined based on latitude and longitude information of the terminal device corresponding to a case that the terminal device measures the reference signal received powers of the plurality of downlink beams in one or more cells, and the geographic space corresponds to one or more cells. The cell is a serving cell or a power angular spectrum cell.

Figure 10:
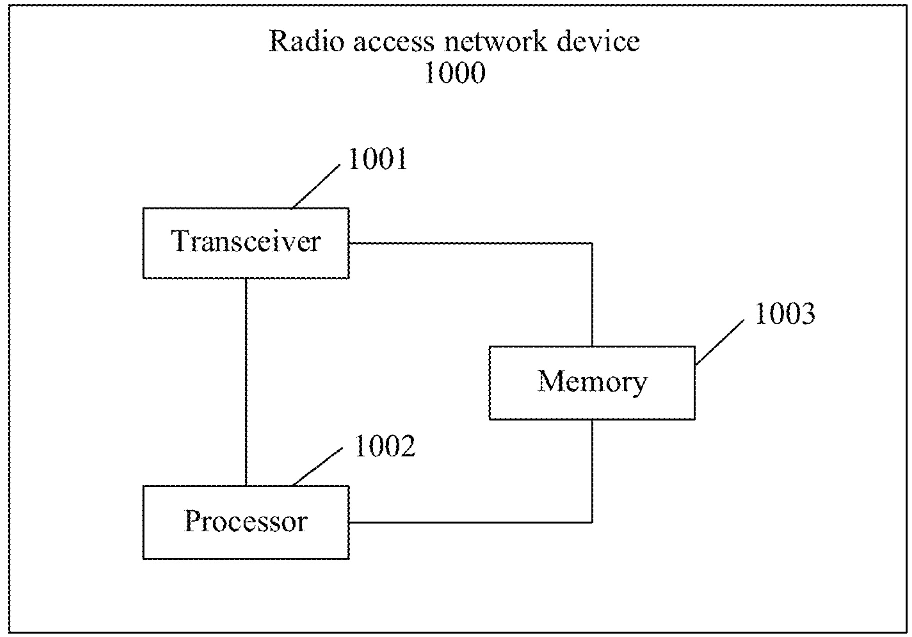
FIG. 10 is a diagram of a radio access network device according to an embodiment of this application.

In an implementation, related functions implemented by units in FIG. 9 may be implemented using a transceiver and a processor FIG. 10 is a diagram of a radio access network device 1000 according to an embodiment of this application. The radio access network device 1000 may be a device (for example, a chip) that can perform the method for determining radio channel multipath information provided in embodiments of this application. The radio access network device 1000 may include a transceiver 1001, at least one processor 1002, and a memory 1003. The transceiver 1001, the processor 1002, and the memory 1003 may be connected to each other through one or more communication buses, or may be connected to each other in another manner.

The transceiver 1001 may be configured to send data or receive data. It may be understood that the transceiver 1001 is a general term, and may include a receiver and a transmitter.

The processor 1002 may be configured to process data of the radio access network device 1000. The processor 1002 may include one or more processors. For example, the processor 1002 may be one or more CPUs, an NP, a hardware chip, or any combination thereof. When the processor 1002 is one CPU, the CPU may be a single-core CPU, or may be a multi-core CPU.

The memory 1003 is configured to store program code and the like. The memory 1003 may include a volatile memory, for example, a RAM. Alternatively, the memory 1003 may include a non-volatile memory, for example, a ROM, a flash memory, an HDD, or an SSD. Alternatively, the memory 1003 may include a combination of the foregoing types of memories.

The processor 1002 and the memory 1003 may be coupled via an interface, or may be integrated together. This is not limited in this embodiment.

The transceiver 1001 and the processor 1002 may be configured to perform the method for determining radio channel multipath information provided in embodiments of this application. An implementation is as follows.

The transceiver 1001 is configured to receive reference signal received powers of a plurality of downlink beams from a terminal device.

The processor 1002 is configured to determine a plurality of pieces of first data, where the first data includes the reference signal received powers of the plurality of downlink beams, a grid identity, a serving cell identity, and a power angular spectrum cell identity, and the plurality of pieces of first data are used to determine a plurality of pieces of second data, where the second data includes an eigenvalue of reference signal received powers of a plurality of downlink beams with a same grid identity, a same serving cell identity, and a same power angular spectrum cell identity in the plurality of pieces of first data, and the plurality of pieces of second data are used to determine a power angular spectrum from an antenna in a power angular spectrum cell indicated by each power angular spectrum cell identity in the second data to a grid indicated by each grid identity in the second data, where the power angular spectrum cell is a cell in which a downlink beam received by the terminal device located in the grid is located, and the power angular spectrum includes a path angle and path strength of a propagation path from the antenna to the grid.

In an implementation, the transceiver 1001 is further configured to send the grid identity to the terminal device. The grid identity indicates the terminal device to measure and report the reference signal received powers of the plurality of downlink beams upon change of the grid identity.

In an implementation, the grid identity is a grid identity of a grid included in beam space, the beam space is determined based on reference signal received powers of a plurality of uplink beams, and the beam space corresponds to one or more cells. The cell is a serving cell or a power angular spectrum cell.

In an implementation, the grid identity is a grid identity of geographic space, the geographic space is determined based on latitude and longitude information of the terminal device corresponding to a case that the terminal device measures the reference signal received powers of the plurality of downlink beams in one or more cells, and the geographic space corresponds to one or more cells. The cell is a serving cell or a power angular spectrum cell.

It may be understood that the foregoing method embodiments may be cited in the apparatus for determining radio channel multipath information and the radio access network device that are shown in FIG. 9 and FIG. 10. For beneficial effects that can be implemented, refer to corresponding descriptions in the foregoing method embodiments. Details are not described herein.

An embodiment of this application provides a communication system. The communication system includes the server and the radio access network device in the foregoing embodiments.

An embodiment of this application provides a computer-readable storage medium. The computer-readable storage medium stores a program or instructions. When the program or the instructions are run on a computer, the computer is enabled to perform the method for determining radio channel multipath information in embodiments of this application.

An embodiment of this application provides a chip or a chip system, where the chip or the chip system includes at least one processor and an interface, the interface and the at least one processor are interconnected through a line, and the at least one processor is configured to run a computer program or instructions, to perform the method for determining radio channel multipath information in embodiments of this application.

The interface in the chip may be an input/output interface, a pin, a circuit, or the like.

The chip system in the foregoing aspects may be a system on chip (SOC), a baseband chip, or the like, where the baseband chip may include a processor, a channel encoder, a digital signal processor, a modem, an interface module, and the like.

In an implementation, the chip or the chip system described above in this application further includes at least one memory, where the at least one memory stores instructions. The memory may be a storage unit, for example, a register or a cache inside the chip, or may be a storage unit (for example, a read-only memory or a random access memory) of the chip.

All or some of the foregoing embodiments may be implemented through software, hardware, firmware, or any combination thereof. When software is used for implementation, all or a part of the implementation may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

A person of ordinary skill in the art may be aware that, in combination with the examples described in embodiments disclosed in this specification, units and algorithm steps may be implemented by electronic hardware, computer software, or a combination of the electronic hardware and computer software. To clearly describe interchangeability between the hardware and the software, the foregoing has generally described compositions and steps of each example based on functions. Whether these functions are executed in a hardware or software manner depends on an application and a constraint of the technical solutions. A person skilled in the art may use different methods to implement the described functions for each particular application, but it should not be considered that the implementation goes beyond the scope of this application.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining radio channel multipath information for a server, the method comprising:

obtaining a plurality of pieces of first data, the first data comprising reference signal received powers of a plurality of downlink beams, a grid identity, a serving cell identity, and a power angular spectrum cell identity;

determining a plurality of pieces of second data based on the plurality of pieces of first data, the second data comprising an eigenvalue of reference signal received powers of a plurality of downlink beams with a same grid identity, a same serving cell identity, and a same power angular spectrum cell identity in the plurality of pieces of first data;

determining, based on the plurality of pieces of second data, a power angular spectrum from an antenna in a power angular spectrum cell indicated by each power angular spectrum cell identity in the second data to a grid indicated by each grid identity in the second data, the power angular spectrum cell comprising a cell in which a downlink beam received by a terminal device located in the grid is located, and the power angular spectrum comprising a path angle and path strength of a propagation path from the antenna to the grid;

obtaining a distance between any two grids of at least two grids that have different serving cell identities and the at least one same power angular spectrum cell identity in the power angular spectrum, wherein the distance is determined based on a quantity of overlapping cells, the power angular spectrum from the antenna in the power angular spectrum cell to the grid, and a distance measurement parameter; and combining, into one grid, two grids between which a distance is less than a specified threshold in the at least two grids that have different serving cell identities and at least one same power angular spectrum cell identity in the power angular spectrum.

2. The method according to claim 1, wherein the grid identity is of a grid comprised in beam space, the beam space is determined based on reference signal received powers of a plurality of uplink beams, and the beam space corresponds to one or more cells.

3. The method according to claim 1, wherein the grid identity is of a grid in geographic space, the geographic space is determined based on latitude and longitude information of the terminal device corresponding to a case that the terminal device measures the reference signal received powers of the plurality of downlink beams in one or more cells, and the geographic space corresponds to the one or more cells.

4. The method according to claim 1, wherein the determining the plurality of pieces of second data based on the plurality of pieces of first data comprises:

obtaining the reference signal received powers of the plurality of downlink beams with the same grid identity, the same serving cell identity, and the same power angular spectrum cell identity in the plurality of pieces of first data; and determining the eigenvalue of the reference signal received powers of the plurality of downlink beams with the same grid identity, the same serving cell identity, and the same power angular spectrum cell identity in the plurality of pieces of first data, wherein the eigenvalue is any one of: an average value of the reference signal received powers of the plurality of downlink beams, a median of the reference signal received powers of the plurality of downlink beams, or a mode of the reference signal received powers of the plurality of downlink beams.

5. The method according to claim 4, wherein the determining, based on the plurality of pieces of second data, the power angular spectrum from the antenna in the power angular spectrum cell indicated by each power angular spectrum cell identity in the second data to a grid indicated by each grid identity in the second data comprises:

determining a beam gain of each beam in the power angular spectrum cell based on an antenna gain of the power angular spectrum cell and an antenna port weight of each beam in the power angular spectrum cell;

determining a target path strength based on the beam gain of the each beam in the power angular spectrum cell and the second data; and determining, based on the target path strength, the power angular spectrum from the antenna in the power angular spectrum cell indicated by the power angular spectrum cell identity to the grid indicated by the grid identity.

6. A method for determining radio channel multipath information for a radio access network device, the method comprising:

receiving reference signal received powers of a plurality of downlink beams from a terminal device;

determining a plurality of pieces of first data, the first data comprising the reference signal received powers of the plurality of downlink beams, a grid identity, a serving cell identity, and a power angular spectrum cell identity;

determining a plurality of pieces of second data based on the plurality of pieces of first data, the second data comprising an eigenvalue of reference signal received powers of a plurality of downlink beams with a same grid identity, a same serving cell identity, and a same power angular spectrum cell identity in the plurality of pieces of first data;

determining, based on the plurality of pieces of second data, a power angular spectrum from an antenna in a power angular spectrum cell indicated by each power angular spectrum cell identity in the second data to a grid indicated by each grid identity in the second data, the power angular spectrum cell comprising a cell in which a downlink beam received by the terminal device located in the grid is located, and the power angular spectrum comprising a path angle and path strength of a propagation path from the antenna to the grid;

obtaining a distance between any two grids of at least two grids that have different serving cell identities and the at least one same power angular spectrum cell identity in the power angular spectrum, wherein the distance is determined based on a quantity of overlapping cells, the power angular spectrum from the antenna in the power angular spectrum cell to the grid, and a distance measurement parameter; and combining, into one grid, two grids between which a distance is less than a specified threshold in the at least two grids that have different serving cell identities and at least one same power angular spectrum cell identity in the power angular spectrum.

7. The method according to claim 6, wherein the method further comprises:

sending the grid identity to the terminal device, the grid identity indicating the terminal device to measure and report the reference signal received powers of the plurality of downlink beams upon change of the grid identity.

8. The method according to claim 6, wherein the grid identity is of a grid comprised in beam space, the beam space is determined based on reference signal received powers of a plurality of uplink beams, and the beam space corresponds to one or more cells.

9. The method according to claim 6, wherein the grid identity is of a grid in geographic space, the geographic space is determined based on latitude and longitude information of the terminal device corresponding to a case that the terminal device measures the reference signal received powers of the plurality of downlink beams in one or more cells, and the geographic space corresponds to the one or more cells.

10. A server, comprising:

a memory storing instructions; and at least one processor in communication with the memory, the at least one processor configured, upon execution of the instructions, to perform the following steps:

obtaining a plurality of pieces of first data, the first data comprising reference signal received powers of a plurality of downlink beams, a grid identity, a serving cell identity, and a power angular spectrum cell identity;

determining a plurality of pieces of second data based on the plurality of pieces of first data, the second data comprising an eigenvalue of reference signal received powers of a plurality of downlink beams with a same grid identity, a same serving cell identity, and a same power angular spectrum cell identity in the plurality of pieces of first data;

determining, based on the plurality of pieces of second data, a power angular spectrum from an antenna in a power angular spectrum cell indicated by each power angular spectrum cell identity in the second data to a grid indicated by each grid identity in the second data, the power angular spectrum cell comprising a cell in which a downlink beam received by a terminal device located in the grid is located, and the power angular spectrum comprising a path angle and path strength of a propagation path from the antenna to the grid;

obtaining a distance between any two grids of at least two grids that have different serving cell identities and the at least one same power angular spectrum cell identity in the power angular spectrum, wherein the distance is determined based on a quantity of overlapping cells, the power angular spectrum from the antenna in the power angular spectrum cell to the grid, and a distance measurement parameter; and combining, into one grid, two grids between which a distance is less than a specified threshold in the at least two grids that have different serving cell identities and at least one same power angular spectrum cell identity in the power angular spectrum.

11. The server according to claim 10, wherein the grid identity is of the grid comprised in beam space, the beam space is determined based on reference signal received powers of a plurality of uplink beams, and the beam space corresponds to one or more cells.

12. The server according to claim 10, wherein the grid identity is of the grid in geographic space, the geographic space is determined based on latitude and longitude information of the terminal device corresponding to a case that the terminal device measures the reference signal received powers of the plurality of downlink beams in one or more cells, and the geographic space corresponds to the one or more cells.

13. The server according to claim 10, wherein the determining the plurality of pieces of second data based on the plurality of pieces of first data comprises:

obtaining the reference signal received powers of the plurality of downlink beams with the same grid identity, the same serving cell identity, and the same power angular spectrum cell identity in the plurality of pieces of first data; and determining the eigenvalue of the reference signal received powers of the plurality of downlink beams with the same grid identity, the same serving cell identity, and the same power angular spectrum cell identity in the plurality of pieces of first data, wherein the eigenvalue is any one of: an average value of the reference signal received powers of the plurality of downlink beams, a median of the reference signal received powers of the plurality of downlink beams, or a mode of the reference signal received powers of the plurality of downlink beams.

14. The server according to claim 13, wherein the determining, based on the plurality of pieces of second data, the power angular spectrum from the antenna in the power angular spectrum cell indicated by each power angular spectrum cell identity in the second data to a grid indicated by each grid identity in the second data comprises:

determining a beam gain of each beam in the power angular spectrum cell based on an antenna gain of the power angular spectrum cell and an antenna port weight of each beam in the power angular spectrum cell;

determining a target path strength based on the beam gain of the each beam in the power angular spectrum cell and the second data; and determining, based on the target path strength, the power angular spectrum from the antenna in the power angular spectrum cell indicated by the power angular spectrum cell identity to the grid indicated by the grid identity.

* * * * *